US009084079B2

(12) United States Patent
Patel et al.

(10) Patent No.: US 9,084,079 B2
(45) Date of Patent: Jul. 14, 2015

(54) SELECTIVELY FORMATTING MEDIA DURING A GROUP COMMUNICATION SESSION

(75) Inventors: Biren R. Patel, San Diego, CA (US); Mark Lindner, Superior, CO (US)

(73) Assignee: QUALCOMM Incorporated, San Diego, CA (US)

( * ) Notice: Subject to any disclaimer, the term of this patent is extended or adjusted under 35 U.S.C. 154(b) by 683 days.

(21) Appl. No.: 12/949,780

(22) Filed: Nov. 19, 2010

(65) Prior Publication Data

US 2012/0129543 A1 May 24, 2012

(51) Int. Cl.
H04B 7/00 (2006.01)
H04W 4/02 (2009.01)
H04N 7/15 (2006.01)
H04L 29/06 (2006.01)
H04W 4/10 (2009.01)
H04W 4/18 (2009.01)
H04W 76/00 (2009.01)

(52) U.S. Cl.
CPC ............ *H04W 4/02* (2013.01); *H04L 65/4038* (2013.01); *H04L 65/604* (2013.01); *H04L 65/605* (2013.01); *H04N 7/15* (2013.01); *H04W 4/023* (2013.01); *H04W 4/026* (2013.01); *H04L 67/38* (2013.01); *H04W 4/10* (2013.01); *H04W 4/185* (2013.01); *H04W 76/005* (2013.01)

(58) Field of Classification Search
CPC ............................... H04H 20/08; H04H 60/80
USPC .................. 455/518, 456.1; 379/88.13, 88.14
See application file for complete search history.

(56) References Cited

U.S. PATENT DOCUMENTS

| 6,671,520 B1 * | 12/2003 | Kim .......................... 455/556.1 |
| 8,160,606 B2 * | 4/2012 | Shrivathsan et al. ........ 455/456.1 |
| 8,355,703 B2 * | 1/2013 | Shaw ............................ 455/413 |
| 2002/0150254 A1 * | 10/2002 | Wilcock et al. .................... 381/1 |
| 2004/0022202 A1 | 2/2004 | Yang et al. |
| 2005/0181872 A1 | 8/2005 | Acharya et al. |
| 2005/0265535 A1 | 12/2005 | Kanada |
| 2006/0276213 A1 * | 12/2006 | Gottschalk et al. ........... 455/518 |

(Continued)

FOREIGN PATENT DOCUMENTS

| JP | H03183288 A | 8/1991 |
| JP | H0646418 A | 2/1994 |
| JP | H1056626 A | 2/1998 |
| JP | 2005341092 A | 12/2005 |

(Continued)

OTHER PUBLICATIONS

International Search Report and Written Opinion—PCT/US2011/061513—ISA/EPO—Feb. 16, 2012.

Primary Examiner — Christopher M Brandt
Assistant Examiner — Joseph Dean, Jr.
(74) Attorney, Agent, or Firm — Raphael Freiwirth

(57) ABSTRACT

In an embodiment, during a group communication session, media is received from a first set of access terminals that belong to a communication group, wherein the received media corresponds to content for presentation to a second set of access terminals that belong to the communication group. In an example, the media can be received either at an application server arbitrating the group communication session, or alternatively at a target access terminal for the received media that belongs to the second set of access terminals. Location information associated with an access terminal among the first or second sets of access terminals is determined, and the received media is selectively reformatted based on the determined location information.

32 Claims, 27 Drawing Sheets

(56) References Cited

U.S. PATENT DOCUMENTS

| | | |
|---|---|---|
| 2007/0047479 A1 | 3/2007 | Shaffer et al. |
| 2008/0136896 A1 | 6/2008 | Graham et al. |
| 2008/0160976 A1 | 7/2008 | Virolainen et al. |
| 2012/0122587 A1* | 5/2012 | Kelly et al. .................. 463/42 |

FOREIGN PATENT DOCUMENTS

| | | |
|---|---|---|
| JP | 2009033348 A | 2/2009 |
| KR | 20060123557 A | 12/2006 |
| WO | WO2005079538 A2 | 9/2005 |
| WO | 2009025747 A1 | 2/2009 |

* cited by examiner

Group Video Session Frame at AT A with ATs B...E
shown in Default Arrangement

Example of Virtual Origination Points/
Directions at AT A

Example of Virtual Origination Points/
Directions at AT B

Example of Virtual Original Points/Directions at AT A for Virtual Poker Table

Visual Representation of Virtual Poker Table at AT A

Visual Representation of Virtual Poker Table at AT B (Application Server)

(AT)

SELECTIVELY FORMATTING MEDIA DURING A GROUP COMMUNICATION SESSION

BACKGROUND OF THE INVENTION

1. Field of the Invention

Embodiments of the present invention are directed to selectively formatting media during a group communication session.

2. Description of the Related Art

Wireless communication systems have developed through various generations, including a first-generation analog wireless phone service (1G), a second-generation (2G) digital wireless phone service (including interim 2.5G and 2.75G networks) and a third-generation (3G) high speed data/Internet-capable wireless service. There are presently many different types of wireless communication systems in use, including Cellular and Personal Communications Service (PCS) systems. Examples of known cellular systems include the cellular Analog Advanced Mobile Phone System (AMPS), and digital cellular systems based on Code Division Multiple Access (CDMA), Frequency Division Multiple Access (FDMA), Time Division Multiple Access (TDMA), the Global System for Mobile access (GSM) variation of TDMA, and newer hybrid digital communication systems using both TDMA and CDMA technologies.

The method for providing CDMA mobile communications was standardized in the United States by the Telecommunications Industry Association/Electronic Industries Association in TIA/EIA/IS-95-A entitled "Mobile Station-Base Station Compatibility Standard for Dual-Mode Wideband Spread Spectrum Cellular System," referred to herein as IS-95. Combined AMPS & CDMA systems are described in TIA/EIA Standard IS-98. Other communications systems are described in the IMT-2000/UM, or International Mobile Telecommunications System 2000/Universal Mobile Telecommunications System, standards covering what are referred to as wideband CDMA (WCDMA), CDMA2000 (such as CDMA2000 1xEV-DO standards, for example) or TD-SCDMA.

In wireless communication systems, mobile stations, handsets, or access terminals (AT) receive signals from fixed position base stations (also referred to as cell sites or cells) that support communication links or service within particular geographic regions adjacent to or surrounding the base stations. Base stations provide entry points to an access network (AN)/radio access network (RAN), which is generally a packet data network using standard Internet Engineering Task Force (IETF) based protocols that support methods for differentiating traffic based on Quality of Service (QoS) requirements. Therefore, the base stations generally interact with ATs through an over the air interface and with the AN through Internet Protocol (IP) network data packets.

In wireless telecommunication systems, Push-to-talk (PTT) capabilities are becoming popular with service sectors and consumers. PTT can support a "dispatch" voice service that operates over standard commercial wireless infrastructures, such as CDMA, FDMA, TDMA, GSM, etc. In a dispatch model, communication between endpoints (ATs) occurs within virtual groups, wherein the voice of one "talker" is transmitted to one or more "listeners." A single instance of this type of communication is commonly referred to as a dispatch call, or simply a PTT call. A PTT call is an instantiation of a group, which defines the characteristics of a call. A group in essence is defined by a member list and associated information, such as group name or group identification.

Conventionally, data packets within a wireless communications network have been configured to be sent to a single destination or access terminal A transmission of data to a single destination is referred to as "unicast". As mobile communications have increased, the ability to transmit given data concurrently to multiple access terminals has become more important. Accordingly, protocols have been adopted to support concurrent data transmissions of the same packet or message to multiple destinations or target access terminals. A "broadcast" refers to a transmission of data packets to all destinations or access terminals (e.g., within a given cell, served by a given service provider, etc.), while a "multicast" refers to a transmission of data packets to a given group of destinations or access terminals. In an example, the given group of destinations or "multicast group" may include more than one and less than all of possible destinations or access terminals (e.g., within a given group, served by a given service provider, etc.). However, it is at least possible in certain situations that the multicast group comprises only one access terminal, similar to a unicast, or alternatively that the multicast group comprises all access terminals (e.g., within a cell or sector), similar to a broadcast.

Broadcasts and/or multicasts may be performed within wireless communication systems in a number of ways, such as performing a plurality of sequential unicast operations to accommodate the multicast group, allocating a unique broadcast/multicast channel (BCH) for handling multiple data transmissions at the same time and the like. A conventional system using a broadcast channel for push-to-talk communications is described in United States Patent Application Publication No. 2007/0049314 dated Mar. 1, 2007 and entitled "Push-To-Talk Group Call System Using CDMA 1x-EVDO Cellular Network", the contents of which are incorporated herein by reference in its entirety. As described in Publication No. 2007/0049314, a broadcast channel can be used for push-to-talk calls using conventional signaling techniques. Although the use of a broadcast channel may improve bandwidth requirements over conventional unicast techniques, the conventional signaling of the broadcast channel can still result in additional overhead and/or delay and may degrade system performance.

The $3^{rd}$ Generation Partnership Project 2 ("3GPP2") defines a broadcast-multicast service (BCMCS) specification for supporting multicast communications in CDMA2000 networks. Accordingly, a version of 3GPP2's BCMCS specification, entitled "CDMA2000 High Rate Broadcast-Multicast Packet Data Air Interface Specification", dated Feb. 14, 2006, Version 1.0 C.S0054-A, is hereby incorporated by reference in its entirety.

SUMMARY

In an embodiment, during a group communication session, media is received from a first set of access terminals that belong to a communication group, wherein the received media corresponds to content for presentation to a second set of access terminals that belong to the communication group. In an example, the media can be received either at an application server arbitrating the group communication session, or alternatively at a target access terminal for the received media that belongs to the second set of access terminals. Location information associated with an access terminal among the first or second sets of access terminals is determined, and the received media is selectively reformatted based on the determined location information.

BRIEF DESCRIPTION OF THE DRAWINGS

A more complete appreciation of embodiments of the invention and many of the attendant advantages thereof will be readily obtained as the same becomes better understood by reference to the following detailed description when considered in connection with the accompanying drawings which are presented solely for illustration and not limitation of the invention, and in which.

Accordingly.

DETAILED DESCRIPTION

Figure 1:
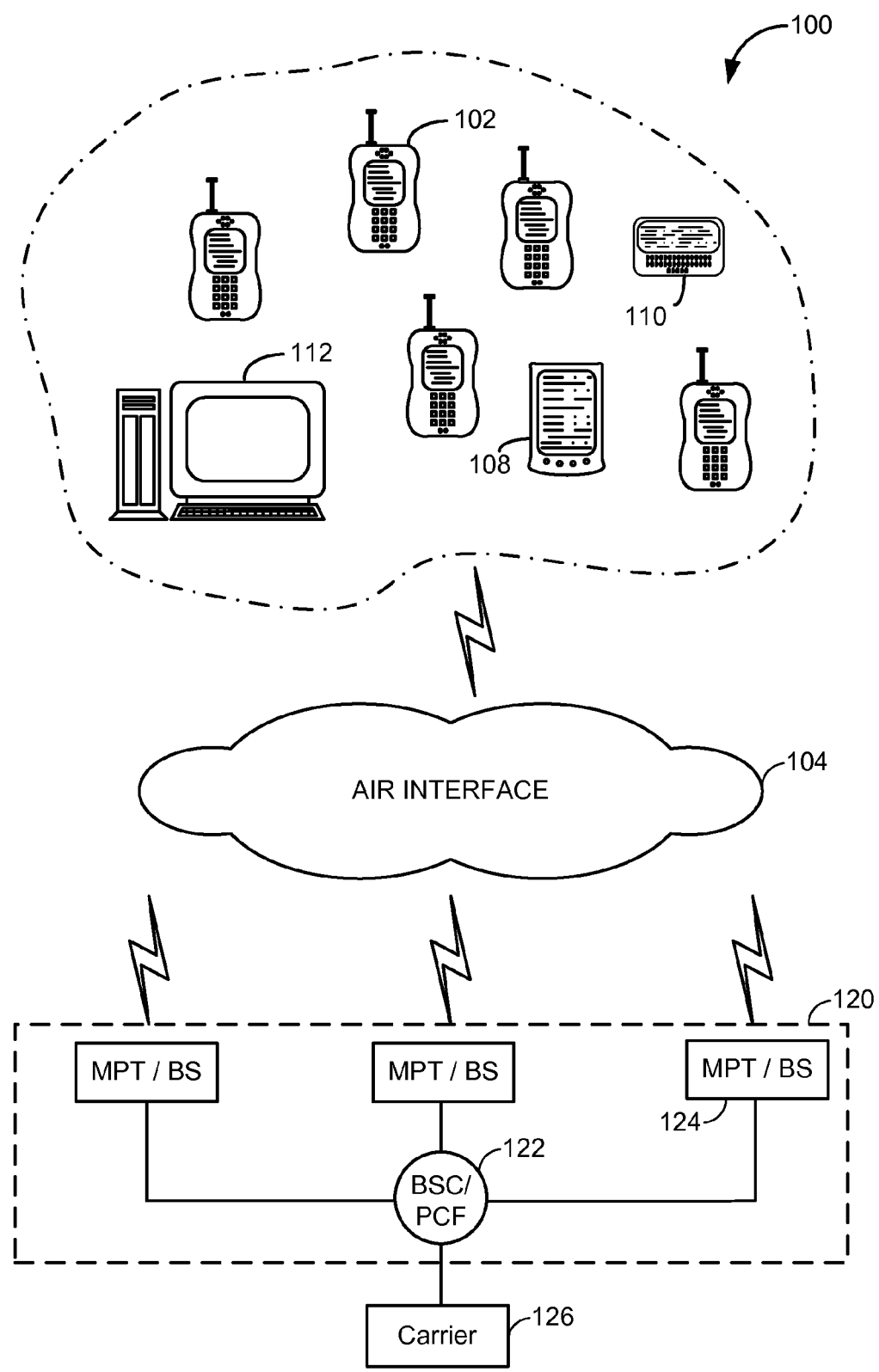
FIG. 1 is a diagram of a wireless network architecture that supports access terminals and access networks in accordance with at least one embodiment of the invention.

Aspects of the invention are disclosed in the following description and related drawings directed to specific embodiments of the invention. Alternate embodiments may be devised without departing from the scope of the invention. Additionally, well-known elements of the invention will not be described in detail or will be omitted so as not to obscure the relevant details of the invention.

The words "exemplary" and/or "example" are used herein to mean "serving as an example, instance, or illustration." Any embodiment described herein as "exemplary" and/or "example" is not necessarily to be construed as preferred or advantageous over other embodiments. Likewise, the term "embodiments of the invention" does not require that all embodiments of the invention include the discussed feature, advantage or mode of operation.

Further, many embodiments are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the invention may be embodied in a number of different forms, all of which have been contemplated to be within the scope of the claimed subject matter. In addition, for each of the embodiments described herein, the corresponding form of any such embodiments may be described herein as, for example, "logic configured to" perform the described action.

A High Data Rate (HDR) subscriber station, referred to herein as an access terminal (AT), may be mobile or stationary, and may communicate with one or more HDR base stations, referred to herein as modem pool transceivers (MPTs) or base stations (BS). An access terminal transmits and receives data packets through one or more modem pool transceivers to an HDR base station controller, referred to as a modem pool controller (MPC), base station controller (BSC) and/or packet control function (PCF). Modem pool transceivers and modem pool controllers are parts of a network called an access network. An access network transports data packets between multiple access terminals.

The access network may be further connected to additional networks outside the access network, such as a corporate intranet or the Internet, and may transport data packets between each access terminal and such outside networks. An access terminal that has established an active traffic channel connection with one or more modem pool transceivers is called an active access terminal, and is said to be in a traffic state. An access terminal that is in the process of establishing an active traffic channel connection with one or more modem pool transceivers is said to be in a connection setup state. An access terminal may be any data device that communicates through a wireless channel or through a wired channel, for example using fiber optic or coaxial cables. An access terminal may further be any of a number of types of devices including but not limited to PC card, compact flash, external or internal modem, or wireless or wireline phone. The communication link through which the access terminal sends signals to the modem pool transceiver is called a reverse link or traffic channel. The communication link through which a modem pool transceiver sends signals to an access terminal is called a forward link or traffic channel. As used herein the term traffic channel can refer to either a forward or reverse traffic channel.

FIG. 1 illustrates a block diagram of one exemplary embodiment of a wireless system 100 in accordance with at least one embodiment of the invention. System 100 can contain access terminals, such as cellular telephone 102, in communication across an air interface 104 with an access network or radio access network (RAN) 120 that can connect the access terminal 102 to network equipment providing data connectivity between a packet switched data network (e.g., an intranet, the Internet, and/or carrier network 126) and the access terminals 102, 108, 110, 112. As shown here, the access terminal can be a cellular telephone 102, a personal digital assistant 108, a pager 110, which is shown here as a two-way text pager, or even a separate computer platform 112 that has a wireless communication portal. Embodiments of the invention can thus be realized on any form of access terminal including a wireless communication portal or having wireless communication capabilities, including without limitation, wireless modems, PCMCIA cards, personal computers, telephones, or any combination or sub-combination thereof. Further, as used herein, the terms "access terminal", "wireless device", "client device", "mobile terminal" and variations thereof may be used interchangeably.

Referring back to FIG. 1, the components of the wireless network 100 and interrelation of the elements of the exemplary embodiments of the invention are not limited to the configuration illustrated. System 100 is merely exemplary and can include any system that allows remote access terminals, such as wireless client computing devices 102, 108, 110, 112 to communicate over-the-air between and among each other and/or between and among components connected via the air interface 104 and RAN 120, including, without limitation, carrier network 126, the Internet, and/or other remote servers.

The RAN 120 controls messages (typically sent as data packets) sent to a base station controller/packet control function (BSC/PCF) 122. The BSC/PCF 122 is responsible for signaling, establishing, and tearing down bearer channels (i.e., data channels) between a packet data service node (See, FIG. 2A 160 "PDSN") and the access terminals 102/108/110/112. If link layer encryption is enabled, the BSC/PCF 122 also encrypts the content before forwarding it over the air interface 104. The function of the BSC/PCF 122 is well-known in the art and will not be discussed further for the sake of brevity. The carrier network 126 may communicate with the BSC/PCF 122 by a network, the Internet and/or a public switched telephone network (PSTN). Alternatively, the BSC/PCF 122 may connect directly to the Internet or external network. Typically, the network or Internet connection between the carrier network 126 and the BSC/PCF 122 transfers data, and the PSTN transfers voice information. The BSC/PCF 122 can be connected to multiple base stations (BS) or modem pool transceivers (MPT) 124. In a similar manner to the carrier network, the BSC/PCF 122 is typically connected to the MPT/BS 124 by a network, the Internet and/or PSTN for data transfer and/or voice information. The MPT/BS 124 can broadcast data messages wirelessly to the access terminals, such as cellular telephone 102. The MPT/BS 124, BSC/PCF 122 and other components may form the RAN 120, as is known in the art. However, alternate configurations may also be used and the invention is not limited to the configuration illustrated. For example, in another embodiment the functionality of the BSC/PCF 122 and one or more of the MPT/BS 124 may be collapsed into a single "hybrid" module having the functionality of both the BSC/PCF 122 and the MPT/BS 124.

Figure 2A:
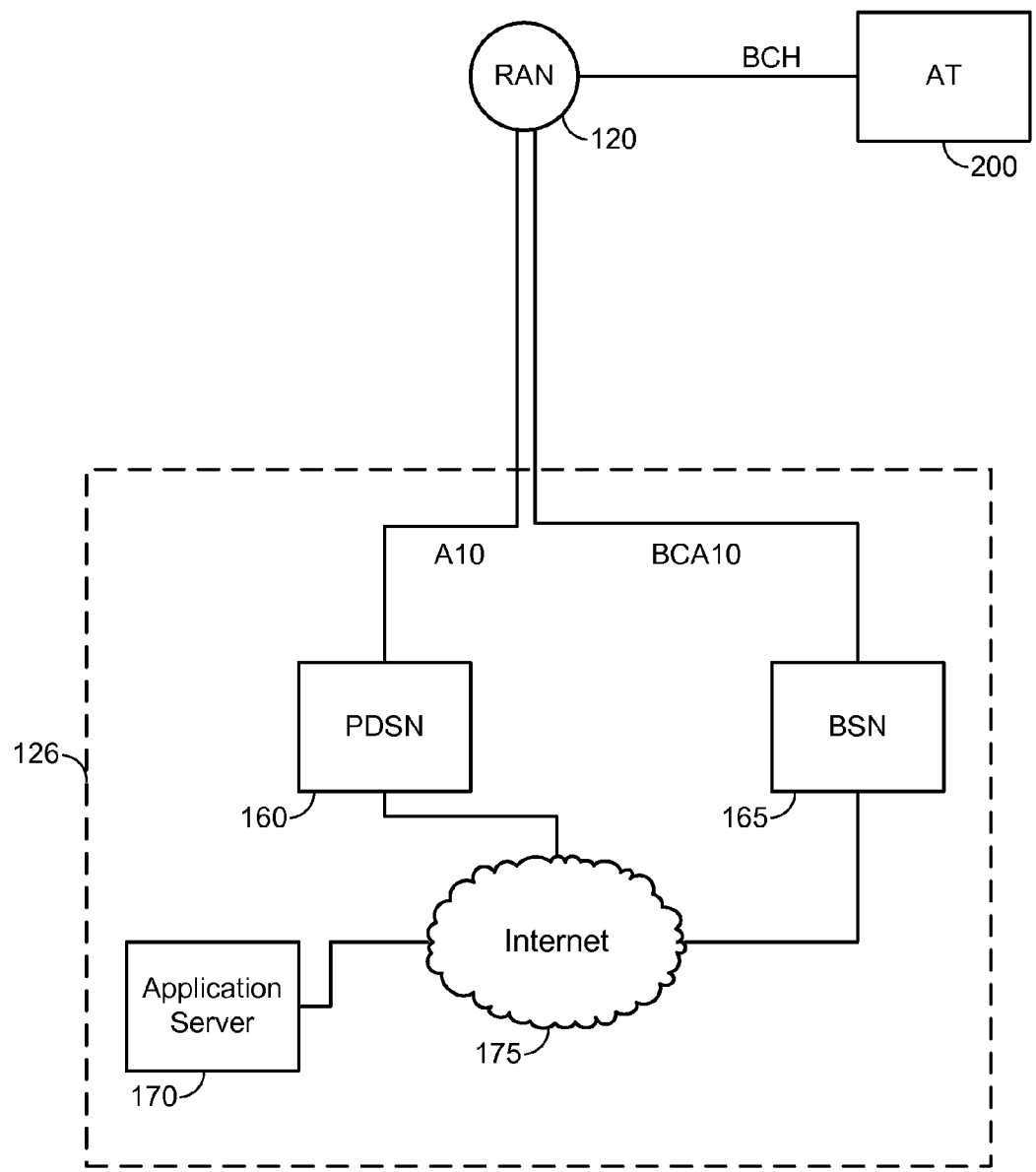
FIG. 2A illustrates the carrier network according to an embodiment of the present invention.

FIG. 2A illustrates the carrier network 126 according to an embodiment of the present invention. In the embodiment of FIG. 2A, the carrier network 126 includes a packet data serving node (PDSN) 160, a broadcast serving node (BSN) 165, an application server 170 and an Internet 175. However, application server 170 and other components may be located outside the carrier network in alternative embodiments. The PDSN 160 provides access to the Internet 175, intranets and/or remote servers (e.g., application server 170) for mobile stations (e.g., access terminals, such as 102, 108, 110, 112 from FIG. 1) utilizing, for example, a cdma2000 Radio Access Network (RAN) (e.g., RAN 120 of FIG. 1). Acting as an access gateway, the PDSN 160 may provide simple IP and mobile IP access, foreign agent support, and packet transport. The PDSN 160 can act as a client for Authentication, Authorization, and Accounting (AAA) servers and other supporting infrastructure and provides mobile stations with a gateway to the IP network as is known in the art. As shown in FIG. 2A, the PDSN 160 may communicate with the RAN 120 (e.g., the BSC/PCF 122) via a conventional A10 connection. The A10 connection is well-known in the art and will not be described further for the sake of brevity.

Referring to FIG. 2A, the broadcast serving node (BSN) 165 may be configured to support multicast and broadcast services. The BSN 165 will be described in greater detail below. The BSN 165 communicates with the RAN 120 (e.g., the BSC/PCF 122) via a broadcast (BC) A10 connection, and with the application server 170 via the Internet 175. The BCA10 connection is used to transfer multicast and/or broadcast messaging. Accordingly, the application server 170 sends unicast messaging to the PDSN 160 via the Internet 175, and sends multicast messaging to the BSN 165 via the Internet 175.

Generally, as will be described in greater detail below, the RAN 120 transmits multicast messages, received from the BSN 165 via the BCA10 connection, over a broadcast channel (BCH) of the air interface 104 to one or more access terminals 200.

Figure 2B:
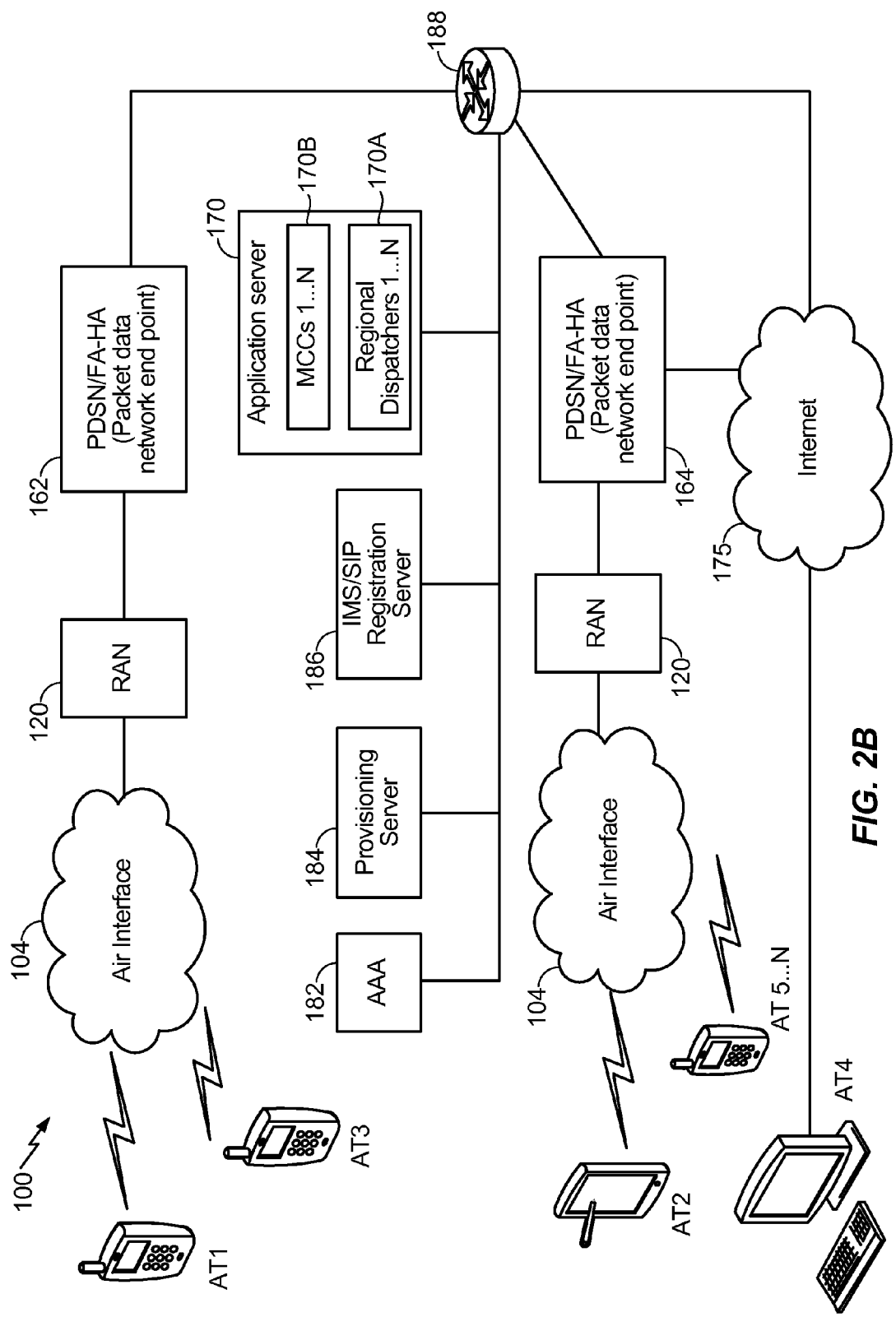
FIG. 2B illustrates an example of the wireless communication of FIG. 1 in more detail in accordance with at least one embodiment of the invention.

FIG. 2B illustrates an example of the wireless communication 100 of FIG. 1 in more detail. In particular, referring to FIG. 2B, ATs 1 . . . N are shown as connecting to the RAN 120 at locations serviced by different packet data network endpoints. Accordingly, ATs 1 and 3 connect to the RAN 120 at a portion served by a first packet data network end-point 162 (e.g., which may correspond to PDSN 160, BSN 165, a home agent (HA), a foreign agent (FA), etc.). The first packet data network end-point 162 in turn connects, via the routing unit 188, to the Internet 175 and/or to one or more of an Authentication, Authorization and Accounting (AAA) server 182, a provisioning server 184, an Internet Protocol (IP) Multimedia Subsystem (IMS)/Session Initiation Protocol (SIP) Registration Server 186 and/or the application server 170. ATs 2 and 5 . . . N connect to the RAN 120 at a portion served by a second packet data network end-point 164 (e.g., which may correspond to PDSN 160, BSN 165, FA, HA, etc.). Similar to the first packet data network end-point 162, the second packet data network end-point 164 in turn connects, via the routing unit 188, to the Internet 175 and/or to one or more of the AAA server 182, a provisioning server 184, an IMS/SIP Registration Server 186 and/or the application server 170. AT 4 connects directly to the Internet 175, and through the Internet 175 can then connect to any of the system components described above.

Referring to FIG. 2B, ATs 1, 3 and 5 . . . N are illustrated as wireless cell-phones, AT 2 is illustrated as a wireless tablet-PC and AT 4 is illustrated as a wired desktop station. However, in other embodiments, it will be appreciated that the wireless communication system 100 can connect to any type of AT, and the examples illustrated in FIG. 2B are not intended to limit the types of ATs that may be implemented within the system. Also, while the AAA 182, the provisioning server 184, the IMS/SIP registration server 186 and the application server 170 are each illustrated as structurally separate servers, one or more of these servers may be consolidated in at least one embodiment of the invention.

Further, referring to FIG. 2B, the application server 170 is illustrated as including a plurality of media control complexes (MCCs) 1 . . . N 170B, and a plurality of regional dispatchers 1 . . . N 170A. Collectively, the regional dispatchers 170A and MCCs 170B are included within the application server 170, which in at least one embodiment can correspond to a distributed network of servers that collectively functions to arbitrate communication sessions (e.g., half-duplex group communication sessions via IP unicasting and/or IP multicasting protocols) within the wireless communication system 100. For example, because the communication sessions arbitrated by the application server 170 can theoretically take place between ATs located anywhere within the system 100, multiple regional dispatchers 170A and MCCs are distributed to reduce latency for the arbitrated communication sessions (e.g., so that a MCC in North America is not relaying media back-and-forth between session participants located in China). Thus, when reference is made to the application server 170, it will be appreciated that the associated functionality can be enforced by one or more of the regional dispatchers 170A and/or one or more of the MCCs 170B. The regional dispatchers 170A are generally responsible for any functionality related to establishing a communication session (e.g., handling signaling messages between the ATs, scheduling and/or sending announce messages, etc.), whereas the MCCs 170B are responsible for hosting the communication session for the duration of the call instance, including conducting an in-call signaling and an actual exchange of media during an arbitrated communication session.

Figure 3:
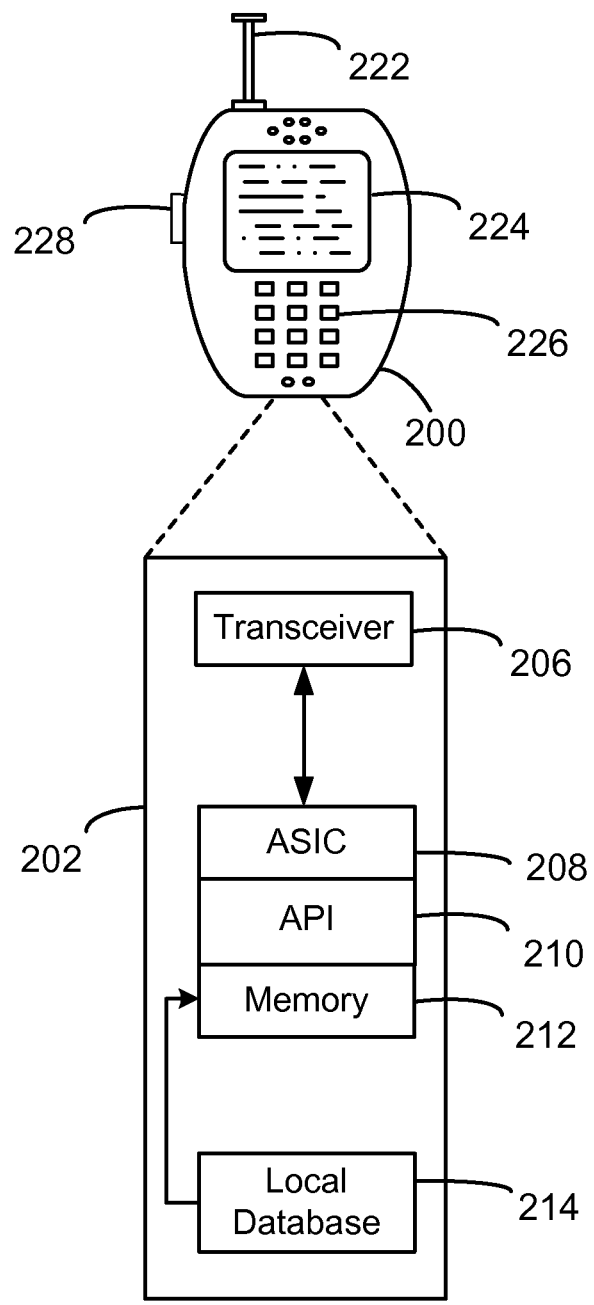
FIG. 3 is an illustration of an access terminal in accordance with at least one embodiment of the invention.

Referring to FIG. 3, an access terminal 200, (here a wireless device), such as a cellular telephone, has a platform 202 that can receive and execute software applications, data and/or commands transmitted from the RAN 120 that may ultimately come from the carrier network 126, the Internet and/or other remote servers and networks. The platform 202 can include a transceiver 206 operably coupled to an application specific integrated circuit ("ASIC" 208), or other processor, microprocessor, logic circuit, or other data processing device. The ASIC 208 or other processor executes the application programming interface (API') 210 layer that interfaces with any resident programs in the memory 212 of the wireless device. The memory 212 can be comprised of read-only or random-access memory (RAM and ROM), EEPROM, flash cards, or any memory common to computer platforms. The platform 202 also can include a local database 214 that can hold applications not actively used in memory 212. The local database 214 is typically a flash memory cell, but can be any secondary storage device as known in the art, such as magnetic media, EEPROM, optical media, tape, soft or hard disk, or the like. The internal platform 202 components can also be operably coupled to external devices such as antenna 222, display 224, push-to-talk button 228 and keypad 226 among other components, as is known in the art.

Accordingly, an embodiment of the invention can include an access terminal including the ability to perform the functions described herein. As will be appreciated by those skilled in the art, the various logic elements can be embodied in discrete elements, software modules executed on a processor or any combination of software and hardware to achieve the functionality disclosed herein. For example, ASIC 208, memory 212, API 210 and local database 214 may all be used cooperatively to load, store and execute the various functions disclosed herein and thus the logic to perform these functions may be distributed over various elements. Alternatively, the functionality could be incorporated into one discrete component. Therefore, the features of the access terminal in FIG. 3 are to be considered merely illustrative and the invention is not limited to the illustrated features or arrangement.

The wireless communication between the access terminal 102 and the RAN 120 can be based on different technologies, such as code division multiple access (CDMA), WCDMA, time division multiple access (TDMA), frequency division multiple access (FDMA), Orthogonal Frequency Division Multiplexing (OFDM), the Global System for Mobile Communications (GSM), or other protocols that may be used in a wireless communications network or a data communications network. The data communication is typically between the client device 102, MPT/BS 124, and BSC/PCF 122. The BSC/PCF 122 can be connected to multiple data networks such as the carrier network 126, PSTN, the Internet, a virtual private network, and the like, thus allowing the access terminal 102 access to a broader communication network. As discussed in the foregoing and known in the art, voice transmission and/or data can be transmitted to the access terminals from the RAN using a variety of networks and configurations. Accordingly, the illustrations provided herein are not intended to limit the embodiments of the invention and are merely to aid in the description of aspects of embodiments of the invention.

Figure 4A:
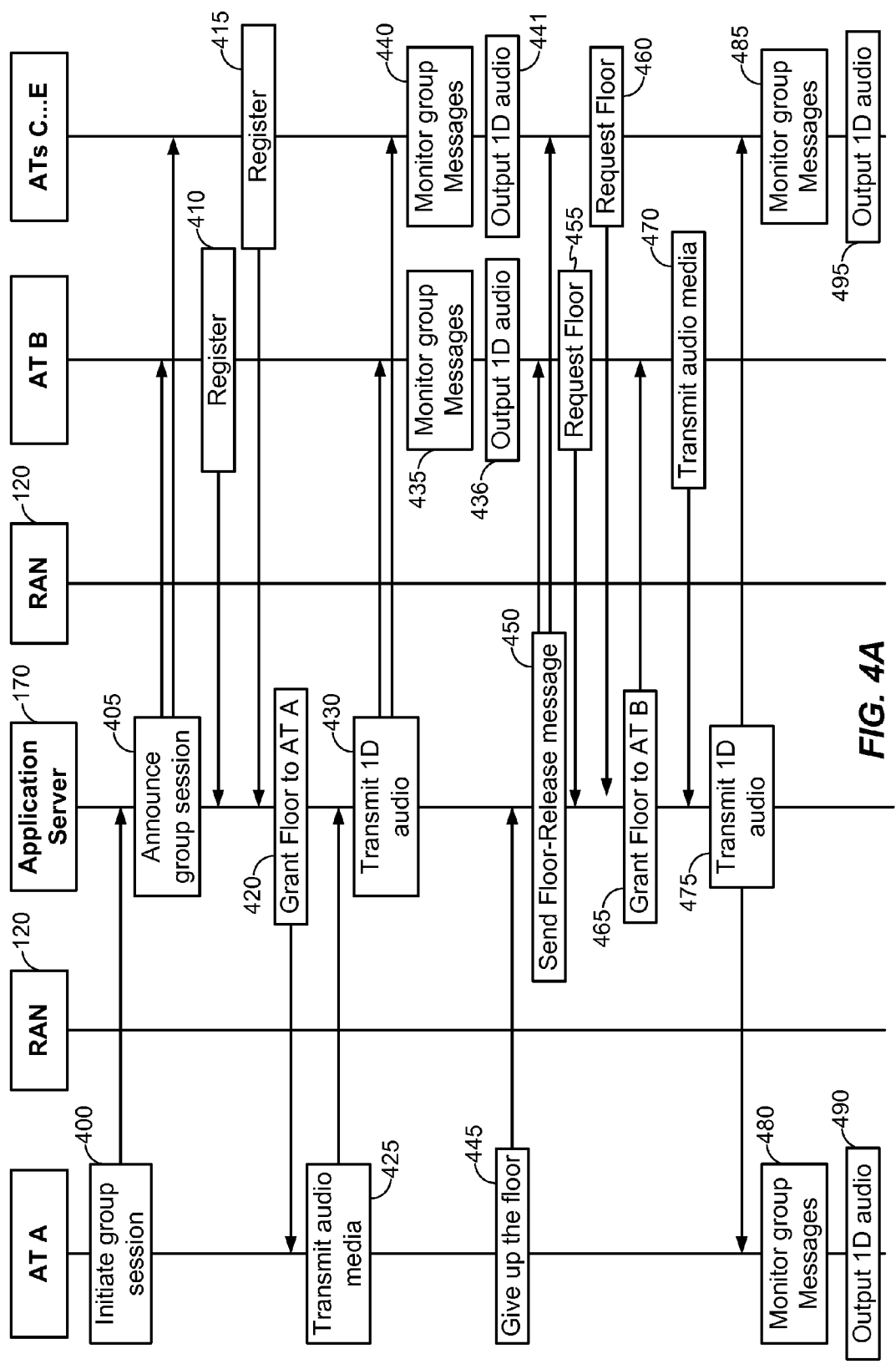
FIG. 4A illustrates a conventional half-duplex group communication session process.

FIG. 4A illustrates a conventional half-duplex group communication session (e.g., a call, a transport session, etc.) process. The group communication session of FIG. 4A may correspond to a group communication session supported by IP multicasting protocols, or IP unicasting protocols. In IP multicasting, a downlink broadcast channel (BCH) carries a single multicast flow within one or more sectors to reach each 'listening' multicast group member, while a separate scheduling message (e.g., a broadcast overhead message (BOM)) is transmitted on a downlink control channel that indicates how the multicast group members can tune to the downlink BCH. In IP unicasting, each group message is transmitted to each group communication session participant, or multicast group member, as a separate unicast message that is addressed to each group member individually. Further, FIG. 4A is directed to a description whereby audio frames are shared between group members of a group audio communication session. However, examples whereby video frames are shared between group members of a group video communication session are described later with respect to FIGS. 5A-5C.

Referring to FIG. 4A, in 400, a given AT ("AT A") sends a request to the application server 170 via the RAN 120 to initiate a group communication session. For example, the group communication session may correspond to a push-to-talk (PTT) or push-to-transfer (PTX) session, and the transmission of the request in 400 may be prompted based on a user of AT A pressing a PTT or PTX button on AT A. The application server 170 receives the group communication session request from AT A, and transmits an announce message in one or more sectors of the wireless communication system 100, 405. At least ATs B . . . E receive the announce message, and determine to join the announced group communication session. Accordingly, ATs B . . . E send a call accept message to the application server 170, and also send a registration message (e.g., BCMCSFlowRegistration message) to the RAN 120 to register to the group communication session, 410 and 415. The call accept message and registration message from each of ATs B . . . E may either be sent within separate messages on a reverse link access channel, or alternatively may be bundled within the same message.

After receiving a call accept message from a first responder to the announce message from among ATs B . . . E, the application server 170 grants the floor for the group communication session to AT A, 420. Accordingly, after receiving the floor-grant message, AT A plays a tone to indicate to a user of AT A that the user can begin speaking, and AT A begins transmitting audio media on a reverse link channel to the RAN 120, which is then forwarded to the application server 170, 425. The transmission of audio media in 425 can include data frames that actually include voice data, and/or silence frames that do not include voice data (e.g., such as when the user of AT A pauses from speaking).

In an example, each frame in the stream of audio media that is transmitted in 425 can correspond to a real-time transport protocol (RTP) packet or datagram, or alternatively a RTCP (RTP Control Protocol) packet. A header portion of a 40-octet overhead RTP packet may be configured as follows:

TABLE 1

| | Example of a RTP packet header | | | |
|---|---|---|---|---|
| | 0 1 2 3 4 5 6 7 | 8 9 10 11 12 13 14 15 | 16 17 18 19 20 21 22 23 | 24 25 26 27 28 29 30 31 |
| | Octet 1, 5, 9... | Octet 2, 6, 10 . . . | Octet 3, 7, 11 . . . | Octet 4, 8, 12 . . . |
| 1-4 | Version IHL | Type of service | | Total length |
| 5-8 | Identification | | Flags | Fragment offset |
| 9-12 | Time to live | Protocol | | Header checksum |
| 13-16 | | | Source address | |
| 17-20 | | | Destination address | |
| 21-24 | | Source port | | Destination port |
| 25-28 | | Length | | Checksum |
| 29-32 | V = 2 P X CC M | PT | | Sequence number |
| 33-36 | | | Timestamp | |
| 37-40 | | Synchronization source (SSRC) number | | |

Referring to Table 1, the fields of the RTP packet header portion are well-known in the art, and will not be described further for the sake of brevity. After the RTP header portion, the RTP packet includes a data payload portion. The data payload portion can include digitized samples of voice and/or video.

Returning to 425 of FIG. 4A, the audio media transmitted in 425 from AT A can be classified as '1D audio'. 1D audio corresponds to audio that, when played back by an audio output device, is not configured to provide a spatial orientation. By contrast, 3D audio can be configured to convey spatial orientation for certain sounds. For example, it is common for movies to encode 3D audio so as to support sound for enhancing the movie-viewing experience. Thereby, a viewer of the movie will hear sounds for the movie, when played by an appropriate speaker system, as if the sounds originated from their relative positions as shown in the movie (e.g., sounds that are associated with an object on the movie screen appear to the viewer as emanating from locations that match the object's location on the screen, such as to the right of the viewer, below the viewer, behind the viewer, etc.).

The application server 170 includes a media control complex (MCC) 170B module that handles the receipt of a media stream from floor-holders, and the transcoding of an output stream to one or more 'listening' group members to the group communication session. In other words, the MCC 170B replicates and re-broadcasts the frames within RTP packets from AT A to each of ATs B . . . E. As the output stream is generated by the MCC 170B, the application server 170 transmits RTP packets including output frames from the output stream to ATs B . . . E, 430, as a series of group messages, and ATs B . . . E monitor the group messages for the group communication session, 435 and 440. ATs B . . . E receive the group messages and output the received audio media as 1D audio via an associated audio output device (e.g., a phone's embedded speakers, a headset, headphones, etc.), 436 and 441. As will be appreciated, the output of the 1D audio in 436 and 441 means that the audio media from AT A is output to the users of ATs B . . . E without a sensory perception of where the source of the 1D audio (i.e., the user of AT A, in this case) is located. Rather, as is typical in 1D audio, the source of the 1D audio would appear, to any listeners, as simply originating from the audio output device itself.

The group communication session then continues for a period of time, until a user of AT A determines to give up the floor, 445. 445 can correspond to an explicit instruction from AT A to give up the floor, or based on a period of inactivity from AT A (i.e., too many silence frames). After determining AT A has given up the floor to the group communication session, the application server 170 sends a floor-release message to ATs B . . . E, 450. Assume that a user of AT B and at least one of ATs C . . . E determine to attempt to gain control of the floor, and send floor request messages to the application server 170, 455 and 460. The application server 170 thereby receives multiple floor request messages, and evaluates priority levels of the ATs requesting the floor to determine the AT that will next be granted the floor. For example, based on the type of group communication session, the RAN 120 may evaluate one or more priority tables maintained at the RAN 120, and may grant the floor to a highest-priority AT from among the ATs requesting the floor. For example, the priority tables may be configured as follows:

TABLE 2

Priority Tables to Evaluate Floor Requests

| User | Priority |
|---|---|
| *Direct Calls* | |
| A | 7 |
| B | 7 |
| C | 7 |
| D | 7 |
| E | 7 |
| *Adhoc Calls* | |
| A | 7 |
| B | 7 |
| C | 7 |
| D | 7 |
| E | 7 |
| *Closed Group Calls* | |
| A | 2 |
| B | 5 |
| C | 7 |
| D | 1 |
| E | 3 |
| *Closed Chat room Calls* | |
| A | 2 |
| B | 5 |
| C | 7 |
| D | 1 |
| E | 3 |

In 465, assume that the application server 170 determines AT B has the highest priority level from among the requesting AT for the call-type of the group communication session, and the application server 170 sends a floor-grant message to AT B. Next, AT B plays a tone to notify a user of AT B that AT B now has the floor, and AT B begins transmitting 1D audio media (e.g., data frames, silence frames, etc.) within one or more RTP packets to the application server 170, 470, which are then converted into an output stream by the MCC 170B and re-transmitted to ATs A and C . . . E, 475.

ATs A and C . . . E monitor the group messages for the group communication session, 480 and 485. ATs A and C . . . E receive the group messages and output the received audio media as 1D audio via an associated audio output device (e.g., a phone's embedded speakers, a headset, headphones, etc.), 490 and 495. As will be appreciated, the output of the 1D audio in 490 and 495 means that the audio media from AT B is output to the users of ATs A and C . . . E without a sensory perception of where the source of the 1D audio (i.e., the user of AT B, in this case) is located. Rather, as is typical in 1D audio, the source of the 1D audio would appear, to any listeners, as simply originating from the audio output device itself.

As is characteristic of a half-duplex session, certain ATs in the group communication session of FIG. 4A only transmit frames (e.g., within RTP packets), while other ATs in the group communication session only receive frames (e.g., within RTP packets). An alternative to the process of FIG. 4A is a full-duplex group communication session, which is described below with respect to FIG. 4B. In a full-duplex session, each participant to the session can both transmit and receive frames (e.g., within RTP packets).

Figure 4B:
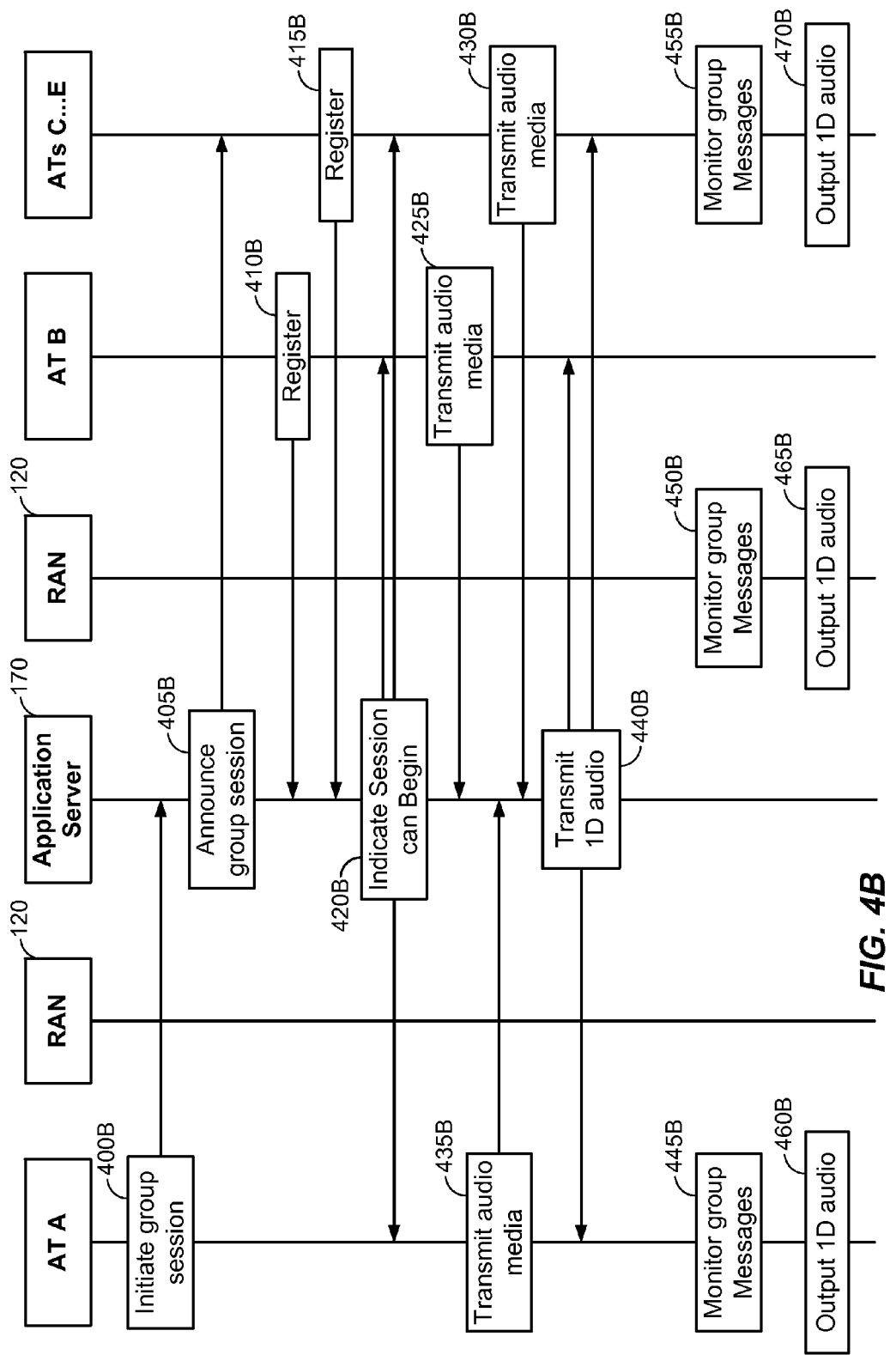
FIG. 4B illustrates a conventional full-duplex group communication session process.

FIG. 4B illustrates a conventional full-duplex group communication session process. As in FIG. 4A, the group communication session of FIG. 4B may correspond to a group communication session supported by IP multicasting protocols, or IP unicasting protocols. Referring to FIG. 4B, 400B through 415B correspond to 400 through 415 of FIG. 4A, and as such will not be discussed further for the sake of brevity.

In 420B, instead of granting the floor to the session initiator (i.e., AT A), the application server 170 sends a message to each AT that has joined the group communication session indicating that the session can begin, 420B. Upon receiving the message 420B, any of ATs A . . . E can begin speaking and thereby send audio media (e.g., data frames or silence frames), 425B, 430B, 435B. As in FIG. 4A, the audio media transmitted in 425B, 430B and 435B corresponds to 1D audio.

Returning to FIG. 4B, in 440B, the MCC 170B of the application server 170 receives the audio media from ATs A . . . E, de jitters the aggregated media stream, and then generates an output stream that includes all the media content from each of ATs A . . . E for a particular time interval. The application server 170 then sends the resultant 1D audio media stream to each of ATs A . . . E as a series of aggregated frames within one or more RTP packets, 440B. However, it is appreciated that each of ATs A . . . E receives an aggregated media stream containing frames from all session participants, except itself, to avoid feedback problems. Thus, AT A receives an output stream composed of aggregated media from ATs B . . . E, AT B receives an output stream composed of aggregated media from ATs A and C . . . E, and so on. ATs A . . . E each receive their respective audio frame(s) from the application server 170, 445B, 450B and 455B. ATs A . . . E then output the 1D audio from their respective audio frames to their users, 460B, 465B and 470B.

Figure 4C:
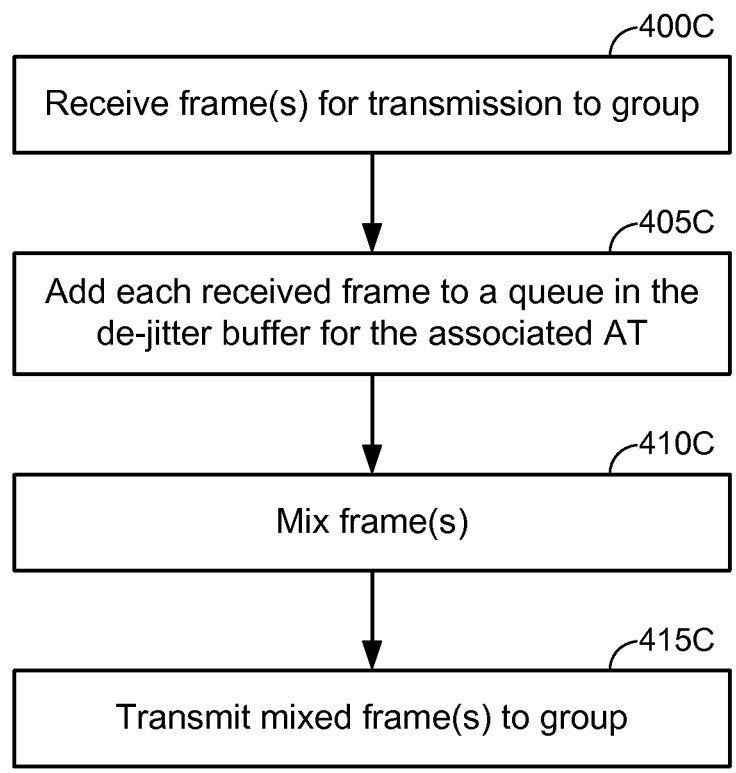
FIG. 4C illustrates in more detail the process that occurs at an application server during FIGS. 4A and 4B.

FIG. 4C illustrates in more detail the process that occurs at the application server 170 during the sending steps of 430 of FIG. 4A, 475 of FIG. 4A and/or 440B of FIG. 4B. Referring to FIG. 4C, the application server 170 receives one or more frames for transmission to a group of ATs, 400C. For example, in 430 of FIG. 4A, the application server 170 receives frame(s) from AT A sent at 425 of FIG. 4A, and in 475 of FIG. 4A, the application server 170 receives frame(s) from AT B sent at 470 of FIG. 4A. In a further example, in 440B of FIG. 4B, the application server 170 receives frame(s) from each of ATs A . . . E sent between 425B and 435B of FIG. 4B.

Upon receiving each of the frames in 400C, a controller of the particular MCC 170B that is handling the media-exchange for the server-arbitrated group communication session adds each received frame from 400C into a corresponding queue in a de jitter buffer for the associated AT, 405C. When a mixer at the MCC 170B is ready, the mixer removes one or more frames from the respective queues of the de jitter buffer for a particular timeslot and performs a mixing operation on the one or more frames, 410C. In the case of half-duplex, there will typically be frames from only one AT (i.e., the current floor-holder), so that actual mixing of media need not be performed, the de-jitter buffer need not be used and frames can simply be forwarded from the MCC 170B as received without header-modification. Accordingly, FIG. 4C is primarily directed to a process performed for a full-duplex session. In the case of full-duplex, there will typically be frames from more than one AT (e.g., although not necessarily from each AT per-timeslot), such that the mixer mixes the actual media, or payload portion, within each frame for a particular timeslot, as is known in the art. As will be appreciated, it is also possible in full-duplex to have frames received from only one AT for a period of time, as in half-duplex, such as when one session participant is doing most of the speaking during the session. However, when a single frame is received during a full-duplex session, the de jitter buffer is still used as when multiple frames are received, such that delays associated with the de-jitter buffer are still experienced. After mixing the frame(s) in 410C, the controller directs the mixed frame(s) to be transmitted to the group.

Figure 4D:
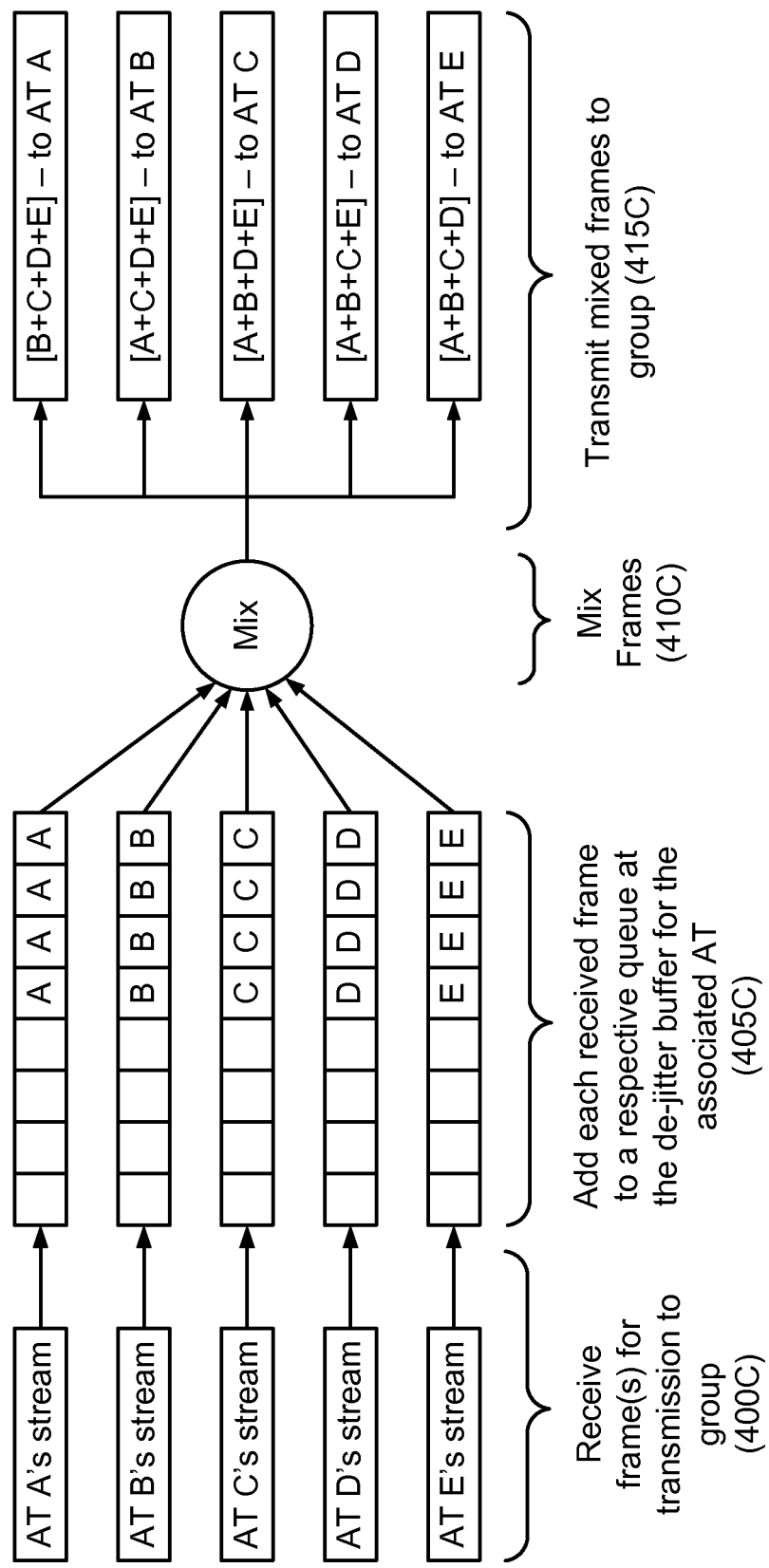
FIGS. 4D and 4E illustrate implementation examples of the process of FIG. 4C.
Figure 4E:
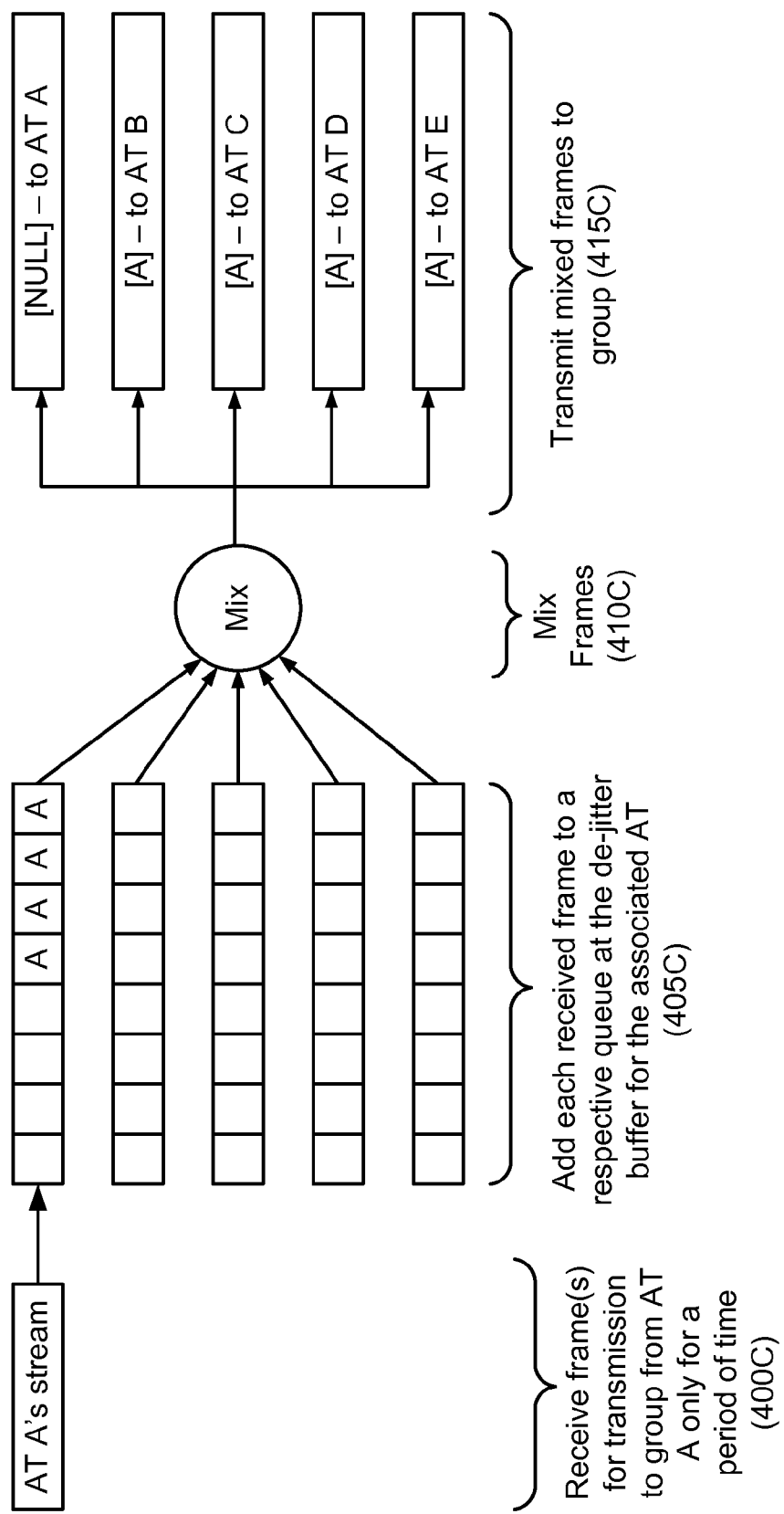

FIGS. 4D and 4E illustrate implementation examples of the process of FIG. 4C. In particular, FIG. 4D illustrates a full-duplex session implementation example where each of ATs A . . . E transmit a frame during each time-slot as in FIG. 4B, and FIG. 4E illustrates an implementation example where only AT 1 transmits a frame during each time-slot for a period of time (e.g., in a full-duplex session where AT A happens to be doing all of the talking for the period of time).

Referring to FIG. 4D, a data stream (e.g., a series of frames) is received from each of ATs A . . . E at the MCC 170B of the application server 170 that is handling the arbitration of the group communication session, 400C. The controller of the MCC 170B adds each received frame from 400C to a queue in the de-jitter buffer for the associated AT, 405C. As shown in FIG. 4D, the queues for each of ATs A . . . E show a number of frames (e.g., denoted by the letter of the corresponding AT from which the frames are received) that are waiting to be processed or mixed by the mixer. When frames for a given timeslot arrive at the top of their respective queues, the controller removes these frames from the queues in the de-jitter buffer and sends these frames to the mixer for mixing, 410C. As such, the mixer mixes the frames from each of ATs A . . . E for a given timeslot in 410C. The manner in which this mixing is implemented in FIG. 4D is such that 1D audio is produced. In other words, when played back at the target ATs, the source of the audio media will be perceived as the same for each speaker.

Then, the controller directs the mixed frames to be transmitted to each session participant of the group communication session, 415C. As shown in FIG. 4D, the mixed frame sent to each AT includes media from each other AT, such that the mixed frame sent to AT A includes frames from ATs B+C+D+E, the mixed frame sent to AT B includes frames from ATs A+C+D+E, the mixed frame sent to AT C includes frames from ATs A+B+D+E, the mixed frame sent to AT D includes frames from ATs A+B+C+E, and the mixed frame sent to AT E includes frames from ATs A+B+C+D.

Referring to FIG. 4E, a data stream (e.g., a series of voice or high-data rate frames) is received from only AT A at the MCC 170B of the application server 170 that is handling the arbitration of a group communication session, 400C. Frames being received from only one AT (e.g., AT A, in this case) can occur during a half-duplex session, or even for a period of time during a full-duplex session where only one AT is sending voice media for transmission to the group. As will be appreciated, other frames can be received at the MCC 170B from one or more other of ATs B . . . E, but these frames are assumed in FIG. 4E to correspond to noise frames or silence frames (e.g., low-data rate frames, etc.) and the controller 170A is configured to drop such frames and refrain from adding such frames to a queue at de-jitter buffer. The controller adds each received frame (e.g., meaning each received voice-frame or high-data rate frame, while excluding noise-frames and/or silence-frames) from 400C to a queue in the de-jitter buffer for the associated AT (i.e., AT A), 405C.

As shown in FIG. 4E, the queue for each of AT A shows a number of frames (e.g., denoted by the letter 'A' in AT A's queue) that are waiting to be processed or mixed by the mixer, whereas the queues for ATs B . . . E are each empty because it is assumed that no voice-packets have been received from ATs B . . . E for a period of time. When a frame for AT A at a given timeslot arrives at the top of its queue, the controller removes the frame from the queue in the de-jitter buffer and sends the frame to the mixer for mixing, 410C. As such, the mixer performs a mixing operation on the frame from AT A for a given timeslot in 410C. In this case, the mixing operation performed by the mixer corresponds to formatting the media in the input-frame such that the RTP header of the output-frame is appropriate for the output stream (e.g., the sequence number from AT A's input stream is modified to correspond to a correct sequence number for a next frame in the output stream, and so on). Then, the controller directs the mixed (or formatted, in this case) frame to be transmitted to one or more session participants of the group communication session, 415C.

As shown in FIG. 4E, the mixed frame sent to each AT includes media from each other AT that is transmitting frames for the time-slot. In this case, because only AT A is transmitting frames for the current timeslot, the formatted frame sent to each of ATs B . . . E includes only AT A's frame, and AT A can be sent a NULL frame (e.g., a frame including no media). Alternatively, while not shown in FIG. 4E, instead of a NULL frame, no frame may be transmitted to AT A in 415C.

As will be appreciated by one of ordinary skill in the art, providing 1D audio to target ATs participating in a group communication session is sufficient to convey the associated audio content, but 1D audio is not capable of providing a location-based 3D representation for the audio media.

Figure 5A:
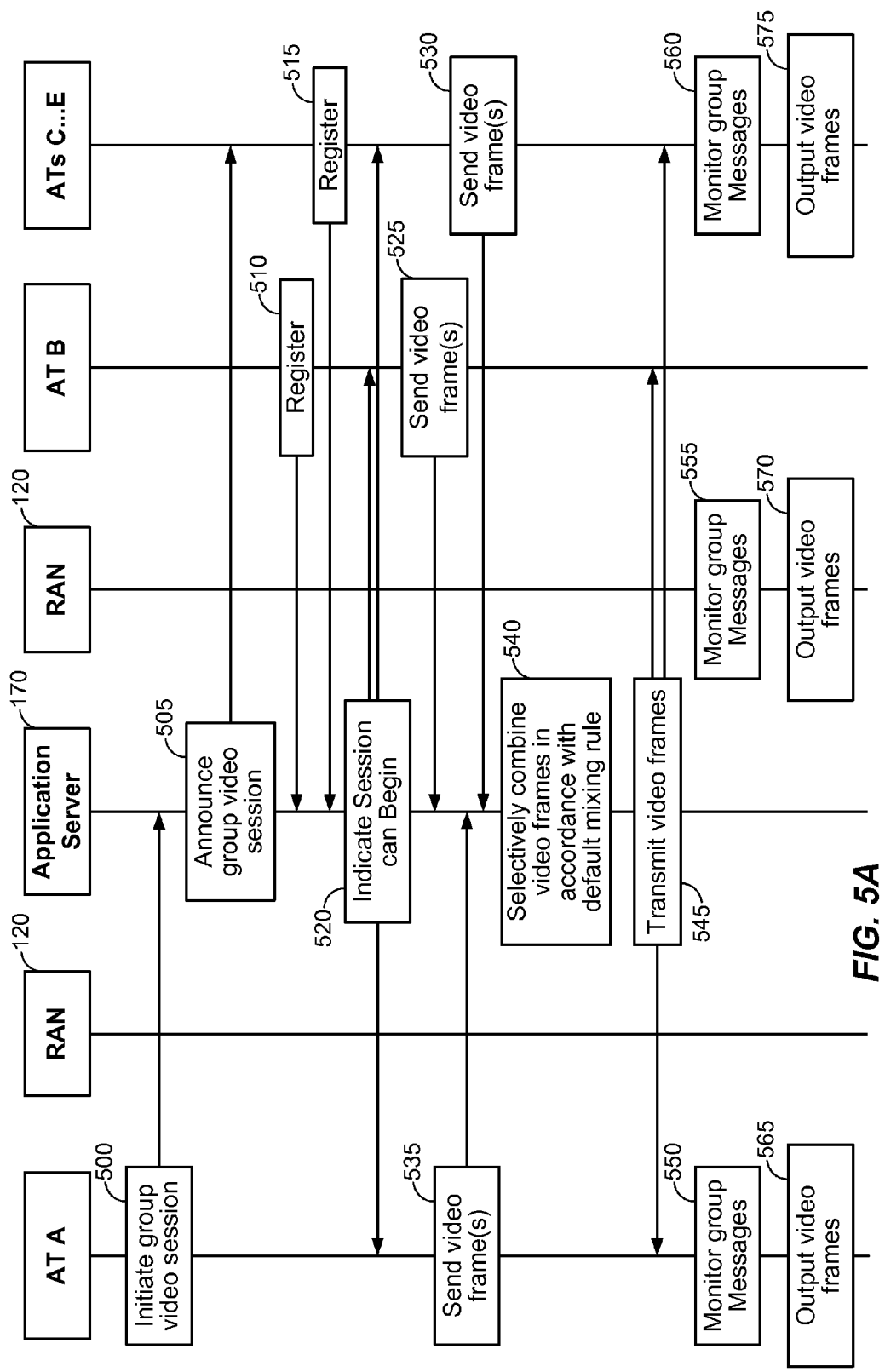
FIG. 5A illustrates a conventional full-duplex group video communication session process.

FIG. 5A illustrates a conventional full-duplex group video communication session process. The group video communication session of FIG. 5A may correspond to a group communication session supported by IP multicasting protocols, or IP unicasting protocols.

Referring to FIG. 5A, in 500, a given AT ("AT A") sends a request to the application server 170 via the RAN 120 to initiate a group video communication session (e.g., a session configured to exchange video, and optionally audio as well). The application server 170 receives the group video communication session request from AT A, and transmits an announce message in one or more sectors of the wireless communication system 100, 505. At least ATs B . . . E receive the announce message, and determine to join the announced group communication session. Accordingly, ATs B . . . E send a call accept message to the application server 170, and also send a registration message (e.g., BCMCSFlowRegistration message) to the RAN 120 to register to the group video communication session, 510 and 515. The call accept message and registration message from each of ATs B . . . E may either be sent within separate messages on a reverse link access channel, or alternatively may be bundled within the same message.

After receiving a call accept message, the application server 170 sends a message to each AT that has joined the group communication session indicating that the session can begin, 520. Upon receiving the message 520, any of ATs A . . . E can begin sending video media (e.g., and also optionally audio media), 525, 530 and 535.

Returning to FIG. 5A, in 540, the MCC 170B of the application server 170 receives the video media from ATs A . . . E, de jitters the aggregated media stream, and then generates an output stream that includes all the media content from each of ATs A . . . E for a particular time interval in accordance with a default mixing rule. The default mixing rule will be described below in greater detail with respect to FIGS. 5B and 5C, but generally corresponds to a manner in which the video media from the respective ATs is combined to provide video output frames to each target AT.

The application server 170 then sends the resultant mixed video media stream to each of ATs A . . . E as a series of aggregated frames within one or more RTP packets, 545. However, it is appreciated that each of ATs A . . . E can receive an aggregated media stream containing frames from all session participants, except itself, to avoid feedback problems (e.g., although if a user wishes to view his/her own video media stream, this can be accomplished internally at the individual ATs without involving the application server 170 in an example). Thus, AT A receives an output stream composed of aggregated media from ATs B . . . E, AT B receives an output stream composed of aggregated media from ATs A and C . . . E, and so on.

Each of ATs A . . . E monitor a downlink channel for receipt of the group messages (i.e., the video media stream) from the application server 170, 550, 555 and 560. Thereby, each of ATs A . . . E receive and then output the video media stream via a display device associated with the respective ATs, 565, 570 and 575.

Figure 5B:
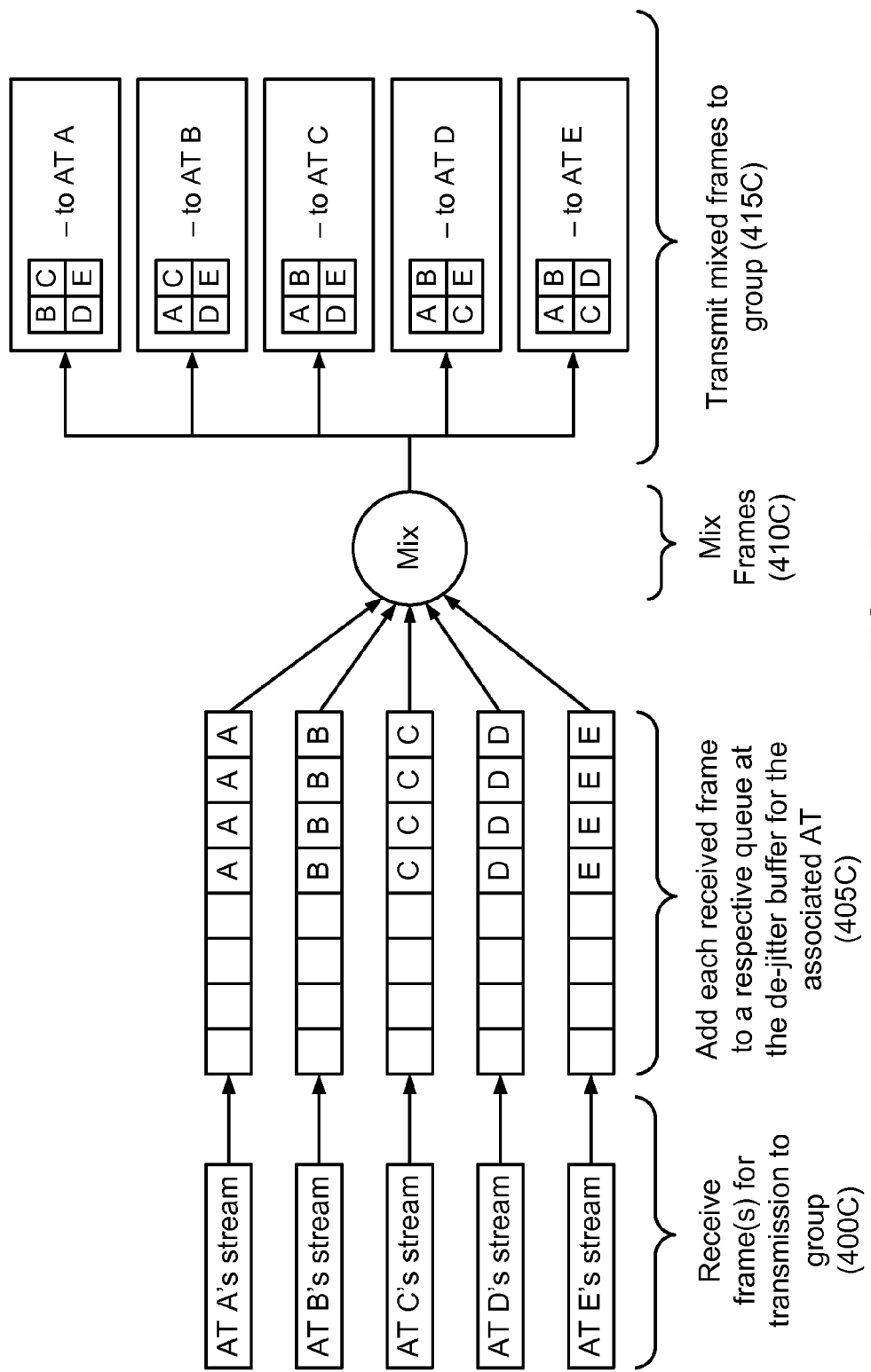
FIG. 5B illustrates an implementation example of mixing that occurs during FIG. 5A.

FIG. 5B illustrates an implementation example of the mixing that occurs at 540 of FIG. 5A. FIG. 5B is described with respect to the general mixing process of FIG. 4C, although it will be appreciated that FIG. 4C was described primarily with respect to audio frames whereas FIG. 5B is directed to mixing video frames.

Referring to FIG. 5B, a stream of video frames is received from each of ATs A . . . E at the MCC 170B of the application server 170 that is handling the arbitration of the group communication session, 400C. The controller of the MCC 170B adds each received frame from 400C to a queue in the de-jitter buffer for the associated AT, 405C. As shown in FIG. 5B, the queues for each of ATs A . . . E show a number of frames (e.g., denoted by the letter of the corresponding AT from which the frames are received) that are waiting to be processed or mixed by the mixer. When frames for a given timeslot arrive at the top of their respective queues, the controller removes these frames from the queues in the de jitter buffer and sends these frames to the mixer for mixing in accordance with the default mixing rule for video frames, 410C. As such, the mixer mixes the frames from each of ATs A . . . E for a given timeslot in 410C.

Referring to FIG. 5B, the controller directs the mixed frames to be transmitted to each session participant of the group video communication session, 415C. As shown in FIG. 5B, the mixed frame sent to each AT includes media from each other AT, such that the mixed frame sent to AT A includes frames from ATs B+C+D+E, the mixed frame sent to AT B includes frames from ATs A+C+D+E, the mixed frame sent to AT C includes frames from ATs A+B+D+E, the mixed frame sent to AT D includes frames from ATs A+B+C+E, and the mixed frame sent to AT E includes frames from ATs A+B+C+D.

More specifically, in FIG. 5B, the default mixing rule is to combine, in clock-wise fashion and in the order of A . . . E (excepting the target AT), the video media from the respective ATs. Thus, because there are five (5) ATs providing video media, each AT will be provided a total of four (4) combined video frames at a time in the output video stream (i.e., the video streams of the four other ATs without the target AT's own video stream). The example of FIG. 5B shows a grid with four slots available for showing video frames from each respective AT. The grid (or video output frame) intended for AT A thereby has AT B's video frame in an upper-left portion, AT C's video frame in an upper-right portion, AT D's video frame in an lower-left portion and AT E's video frame in an lower-right portion. The remaining video-frame arrangements in the output video frame or stream will be appreciated from a review of FIG. 5B.

Figure 5C:
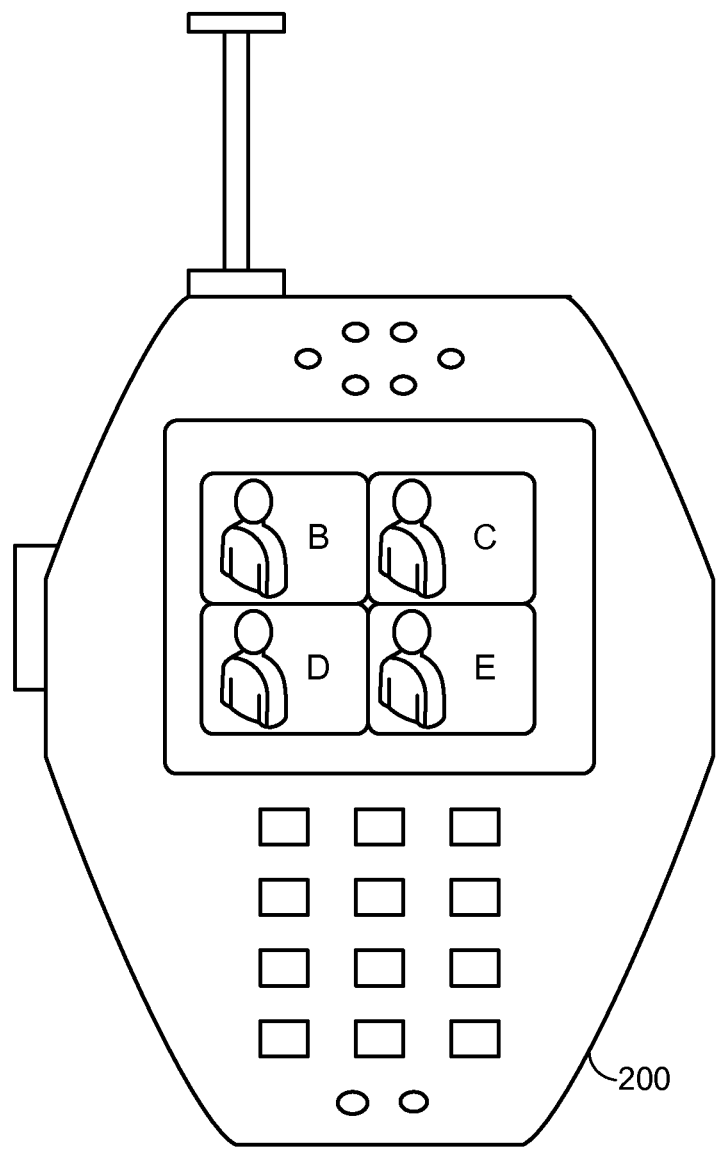
FIG. 5C illustrates an example of video playback that is achieved at an access terminal when video streams are mixed as shown in FIG. 5B.

FIG. 5C illustrates an example of the video playback that is achieved at AT A when the video streams from ATs B . . . E are mixed as shown in FIG. 5B. Accordingly, the users of ATs B . . . E are each video-taping themselves and providing video frames which are mixed by the application server 170 in accordance with the default mixing rule and then sent to AT A for presentation to AT A's user. As noted above with respect to FIG. 5B, this means that AT B's video frame is shown in the top-left portion of AT A's display, AT C's video frame is shown in the top-right portion of AT A's display, AT D's video frame is shown in the bottom-left portion of AT A's display and AT E's video frame is shown in the bottom-right portion of AT A's display.

As will be appreciated by one of ordinary skill in the art, the 1D audio playback of the group communication sessions described with respect to FIGS. 4A-4E does not take virtual or physical locations of the respective call participants into account. Thus, if each call participant is located in a different country, a different floor of a building or a different online chat-room or poker-game seating position, the audio is mixed in a manner such that the call participants are perceived, from the standpoint at a user of a target AT, as originating from the same source or origination point or direction. Also, the arrangement of the positions of the AT-specific video portions of the group video communication described with respect to FIGS. 5A-5C are not based on the respective locations of the call participants, but are rather the result of a default mixing algorithm.

Accordingly, embodiments of the invention are directed to taking location-information into account when formatting media for presentation to a user of an access terminal during a group communication session. The embodiments can be directed to group audio communication sessions (e.g., as shown in FIGS. 7A-7G) or to group video communication sessions (e.g., as shown in FIGS. 8A-8C). The embodiments can be implemented at the application server 170 (e.g., as shown in FIGS. 6-8C) or alternatively at the ATs themselves (e.g., as shown in FIGS. 9A-9E). The group communication sessions themselves can be half-duplex, hybrid-duplex (e.g., more than one and less than all session participants can hold the floor) or full-duplex (e.g., each session participants can send media to the group or hold the floor).

Figure 6A:
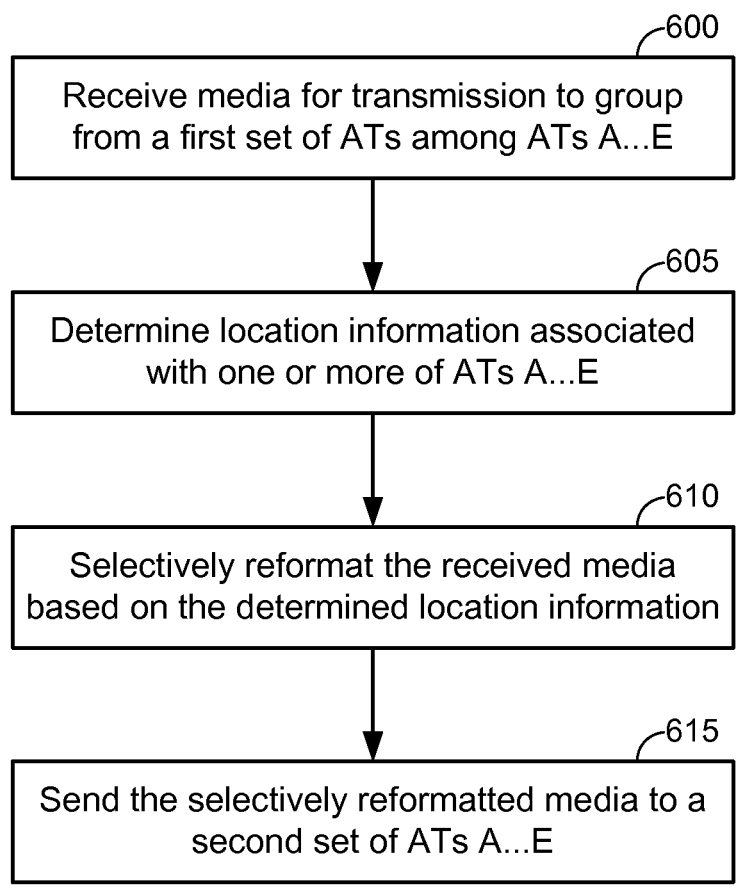
FIG. 6A illustrates a high-level media reformatting or mixing process that is implemented at the application server in accordance with at least one embodiment of the invention.

FIG. 6A illustrates a high-level media reformatting or mixing process that is implemented at the application server 170 in accordance with at least one embodiment of the invention. Referring to FIG. 6A, the application server 170 is arbitrating a group communication session (e.g., an audio and/or video group communication session) between ATs A . . . E, and the application server 170 receives media from a first set of ATs among ATs A . . . E for transmission to the communication group, 600. The first set of ATs from which media is received can correspond to a single AT, all ATs participating in the communication session or an intermediate number of ATs. Next, the application server 170 determines location information associated with one or more of ATs A . . . E, 605.

In an example, the location information can correspond to a geographic position or location of the one or more ATs. For example, ATs A . . . E can report their respective geographic positions (e.g., computed via GPS or some other location-determination mechanism) to the application server 170. These reports can be periodic, can be triggered at set-up of the communication session or can be provided via some other basis. In an alternative example, the location information can instead correspond to a serving area of the respective ATs. For example, knowledge of which base station is currently serving the ATs can grant the application server 170 a coarse location estimate of the location of the ATs.

In another example, the location information can be virtual and not based on geographic position at all. For example, assume that the group communication session is associated with an online poker game. It is typical that online poker games are visually presented to the players (or spectators) as if the players are sitting around an actual poker table. However, the 'virtual' positions of the players around the poker table do not necessarily have anything to do with their physical locations in the real-world. Players from all over the world can be shown as seated together at a single table via online avatars and/or video feeds. In this case, the virtual positions of the respective poker players around the virtual table can be interpreted by the application server 170 as the location information. This type of location information can be acquired by the application server 170 from the server that is hosting the poker game (which may or may not correspond to the application server 170), or alternatively can be inferred based on the order-of-arrival of the respective poker players into the game.

After obtaining the location information of the one or more ATs in 605, the application server 170 selectively reformats the received media from 600 based on the determined location information. Many different examples of how the received media can be reformatted are provided below. After reformatting the media in 610, the application server 170 sends the reformatted media to a second set of ATs A . . . E, 615. In an example, the first set and the second set can be the same, such as when each participant in a full-duplex session receives media from the other session participants. However, the first set and the second set can also be different, such as during a half-duplex session when the first set corresponds to the speaker or floorholder and the second set corresponds to the listeners or non-floorholders. As will be appreciated, the media need not be sent back to the AT that provided the media, such that each participating AT can receive media only from other ATs in at least one embodiment of the invention. However, this is simply an example implementation, as it is at least theoretically possible that a user of a particular AT may want his/her video stream to be fed back to him/her AT from the application server 170.

Figure 6B:
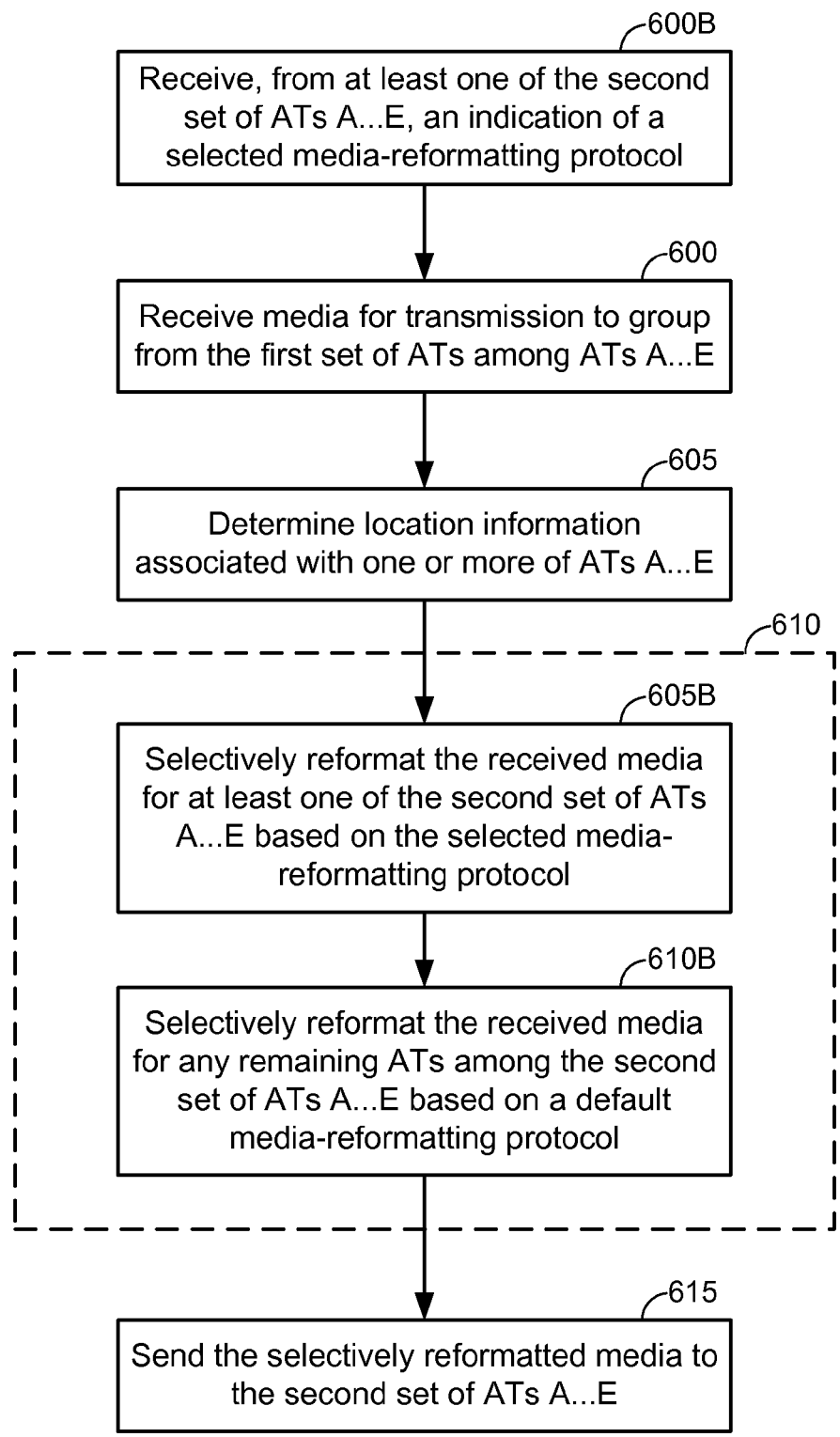
FIG. 6B illustrates an example implementation of the process of FIG. 6A.

FIG. 6B illustrates an example implementation of the process of FIG. 6A. In FIG. 6A, the received media is described as being reformatted by the application server 170 based on the location information determined in 605. FIG. 6B focuses on an example implementation whereby the manner in which the application server 170 reformats the media, for at least one of the target ATs, is based on a selection made by the target AT(s). For example, in an example whereby the media pertains to audio, the selected media-reformatting protocol can correspond positioning female-speakers in 'front' of the target user and male-speakers on the 'left' or 'right' of the target user. In another example, a particular user may be deaf in his or her left ear, and the selected media-reformatting protocol can correspond to positioning speakers at different points to the 'right' of the user. As will be appreciated, there are numerous media-reformatting protocols that can be selected by any number of users, either from a predetermined set of media-reformatting protocol options or in a user-customized manner. Thereby, the application server 170 can, in certain implementations, reformat the received media on a user-by-user or target-by-target basis in accordance with one or more selections.

Accordingly, referring to FIG. 6B, the application server 170 receives, from at least one of the second set of ATs A . . . E, an indication of a selected media-reformatting protocol, 600B. As noted above, the selected media-reformatting protocol can correspond to instructions with regard to how the application server 170 is to reformat media (e.g., audio media, video media, etc.) for one or more particular target ATs. Next, the application server 170 receives media from the first set of ATs among ATs A . . . E for transmission to the communication group, 600, and the application server 170 determines location information associated with one or more of ATs A . . . E, 605.

After obtaining the location information of the one or more ATs in 605, the application server 170 selectively reformats the received media from 600 in 610 based at least in part on the determined location information. In particular, in the embodiment of FIG. 6B, the selectively reformatting step of 610 includes selectively reformatting the received media for the AT(s) that provided indications in 600 in accordance with their respective selected media-reformatting protocol(s), 605B. If there are any remaining ATs within the second set of ATs that did not provide media-reformatting protocol selections in 600B, the application server 170 also selectively reformats the received media from the first set of ATs for the remaining ATs, 610B. In an example, the selectively reformatting of 610B can occur based on the determined location information via some type of default media-reformatting protocol that is selected in the absence of knowledge relating to a given user's preferences on media arrangement. After reformatting the media in 610, the application server 170 sends the reformatted media to a second set of ATs A . . . E, 615.

Figure 7A:
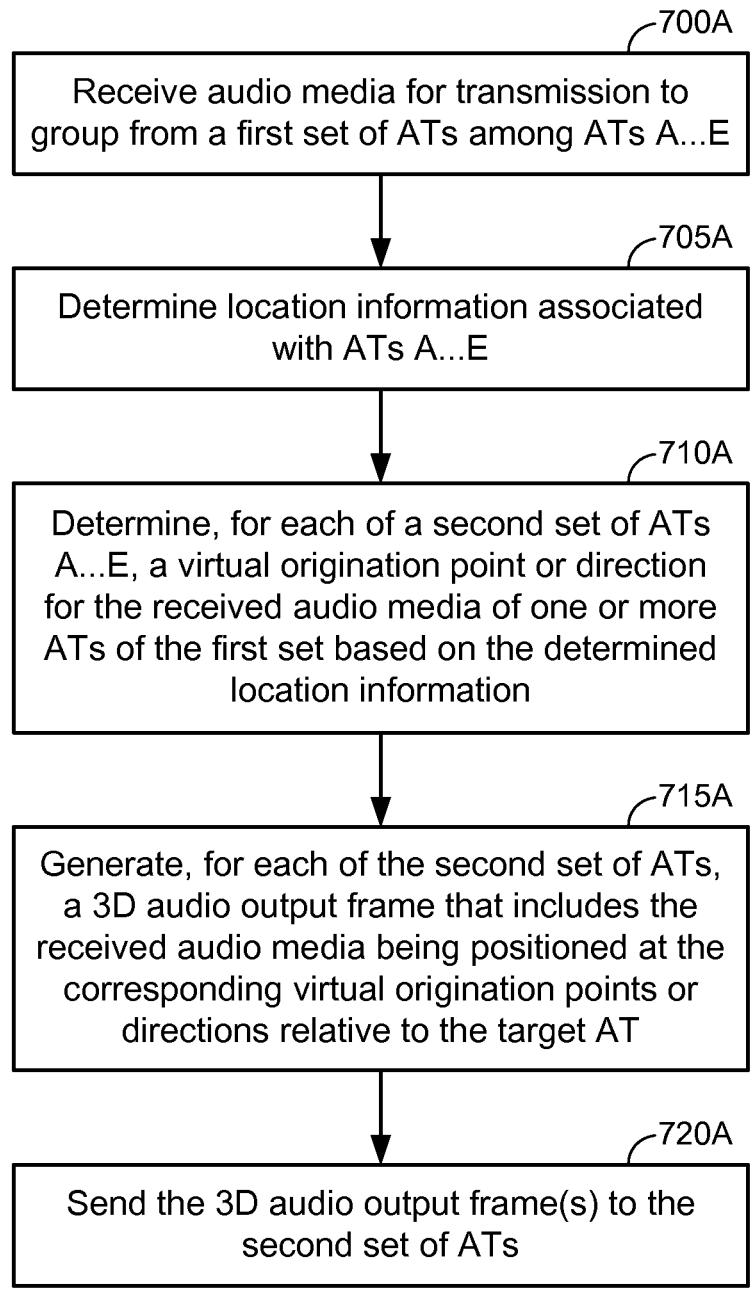
FIG. 7A illustrates a more detailed implementation example of the process of FIG. 6A applied to a group audio communication session in accordance with an embodiment of the invention.
Figure 8A:
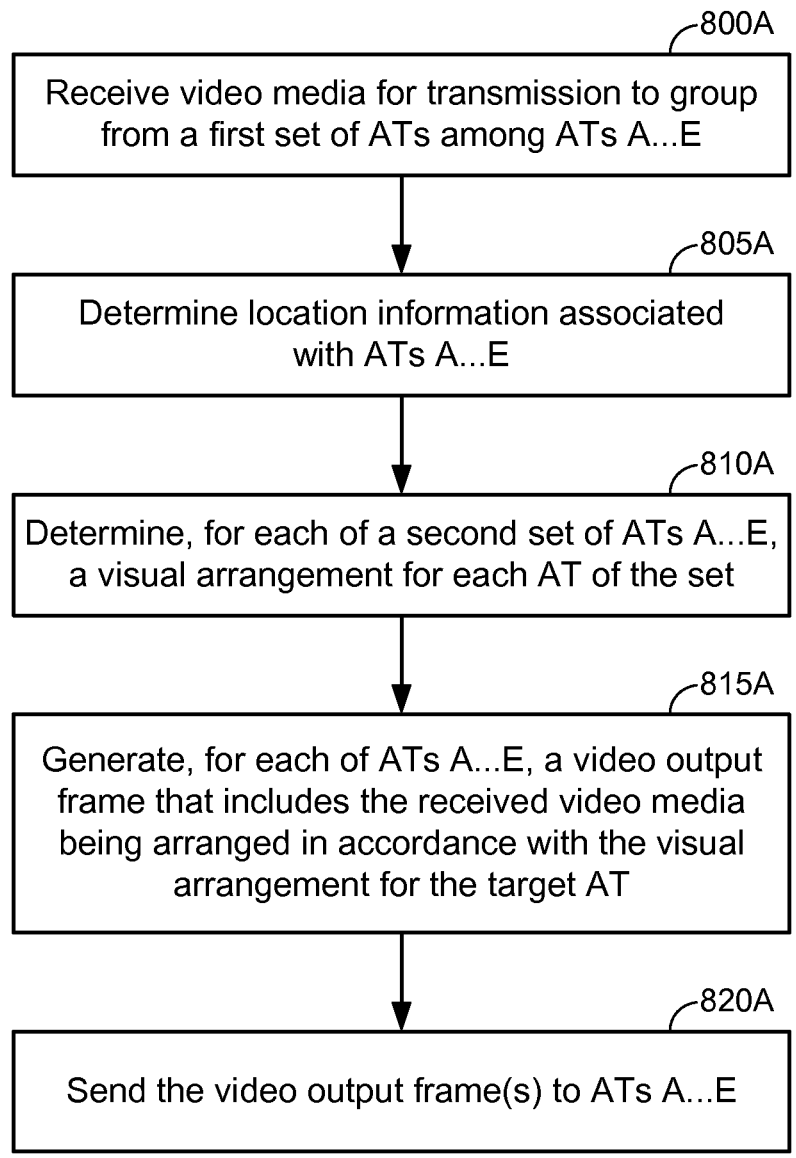
FIG. 8A illustrates a more detailed implementation example of the process of FIG. 6A applied to a group video communication session in accordance with an embodiment of the invention.
Figure 8B:
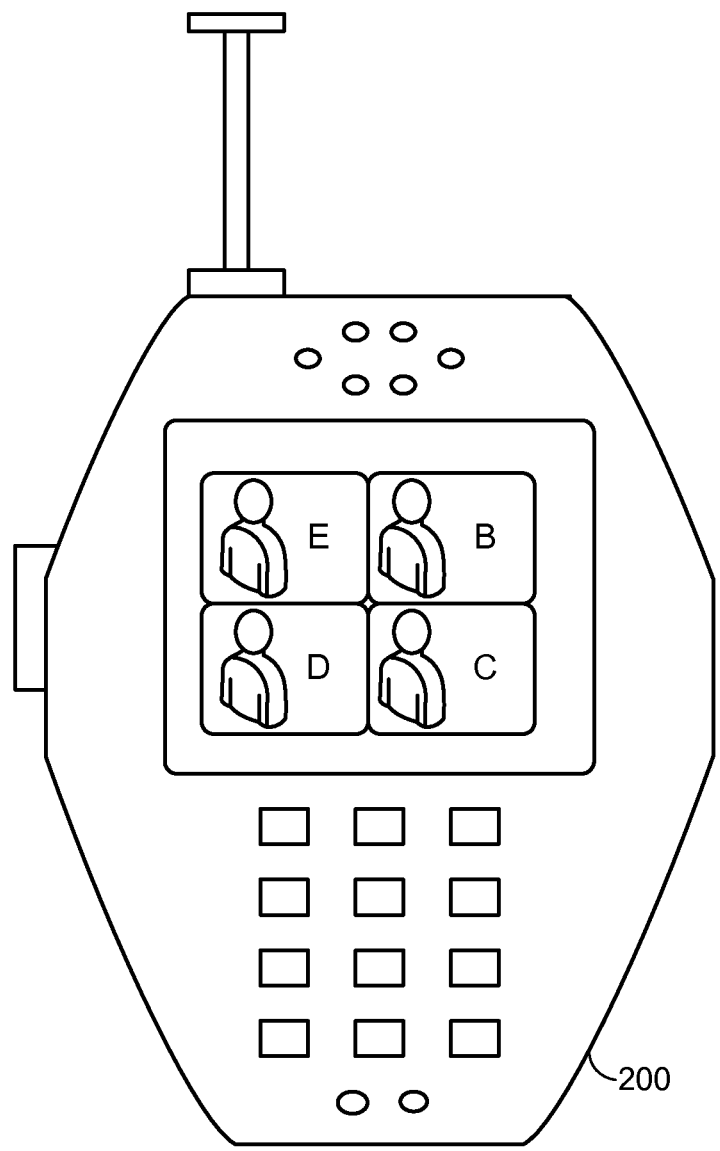
FIG. 8B illustrates an example visual arrangement of video media for an online poker game as illustrated in FIGS. 7D and 7E in accordance with an embodiment of the invention.
Figure 8C:
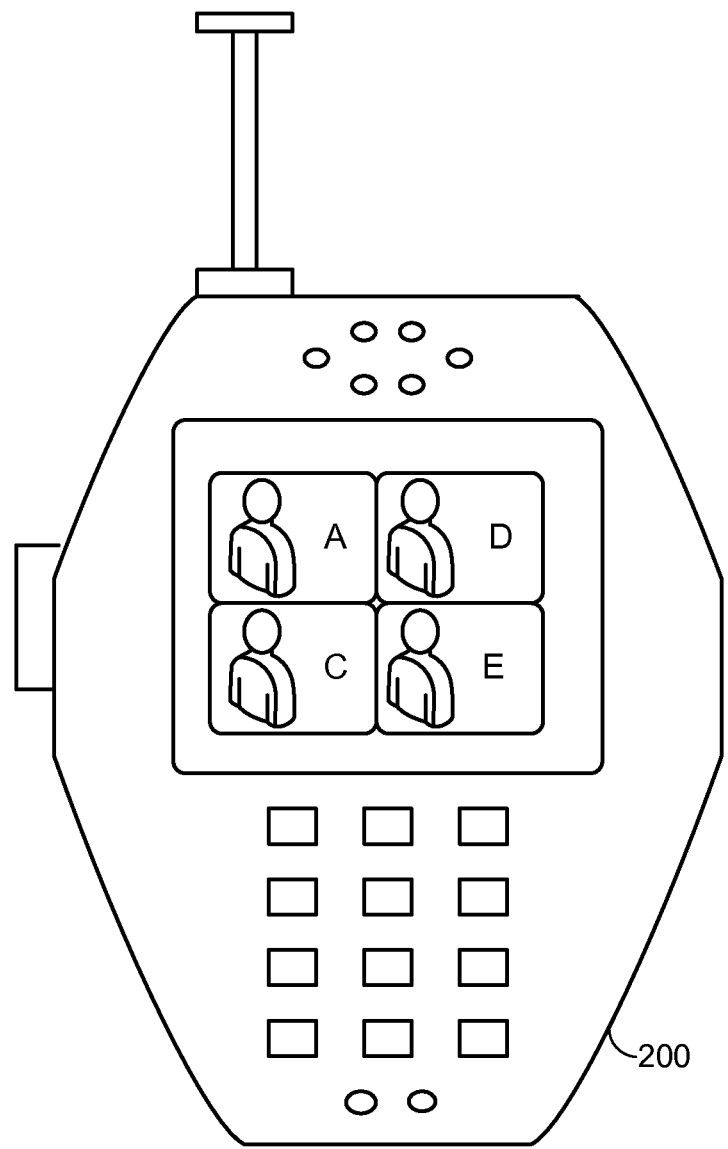
FIG. 8C illustrates an example visual arrangement of video media for an online poker game as illustrated in FIGS. 7D and 7E in accordance with another embodiment of the invention.

FIG. 7A illustrates a more detailed implementation example of the process of FIG. 6A applied to a group audio communication session in accordance with an embodiment of the invention.

Referring to FIG. 7A, the application server 170 is arbitrating a group communication session that includes an exchange of audio media between ATs A . . . E, and the application server 170 receives audio media from a set of ATs among ATs A . . . E for transmission to the communication group, 700A. 700A of FIG. 7A is similar to 600 of FIG. 6A except that 700A is more specifically directed to audio media. In an example, the audio media received in 700A can arrive at the application server 170 in a 1D audio format. Next, as in 605 of FIG. 6A, the application server 170 determines location information associated with one or more of ATs A . . . E, 705A.

Next, the application server 170 determines, for each of a second set of ATs A . . . E that are targets for the received media, a virtual origination point or direction for the received audio media of each AT of the set based on the determined location information, 710A. Examples of virtual origination points or directions will be described later with respect to FIGS. 7B through 7E from the perspective of AT A. After determining the virtual origination points or directions in 710A, the application server 170 generates, for each of the second set of ATs, a 3D audio output frame that includes the received audio media being positioned at the corresponding virtual origination points or directions relative to the target AT, 715A. As will be appreciated, the second set of ATs may include each of ATs A . . . E if each of ATs A . . . E will be receiving a 3D audio frame. In another example, if only one particular AT is providing audio media, then each AT except the AT providing the audio media may be a target AT for receiving the 3D audio to reduce feedback to the transmitting AT. In this case, the second set would include each AT among ATs A . . . E except for the AT providing the audio media.

After generating the 3D audio output frames in 715A, the application server 170 sends the 3D audio frames to their corresponding target AT, 720A. As noted above, each of ATs A . . . E may receive audio frames comprised of different sets of source-ATs (e.g., AT A is sent an audio frame comprised of audio media from ATs B . . . E, and so on). Also, it will be appreciated that the location information of the set of ATs may be considered relative to the location information of the target AT for a particular audio frame. Thereby, the virtual origination points or directions of the same AT vary between target ATs in at least one embodiment. This aspect is described in more detail below with respect to FIGS. 7B through 7E.

Figure 7B:
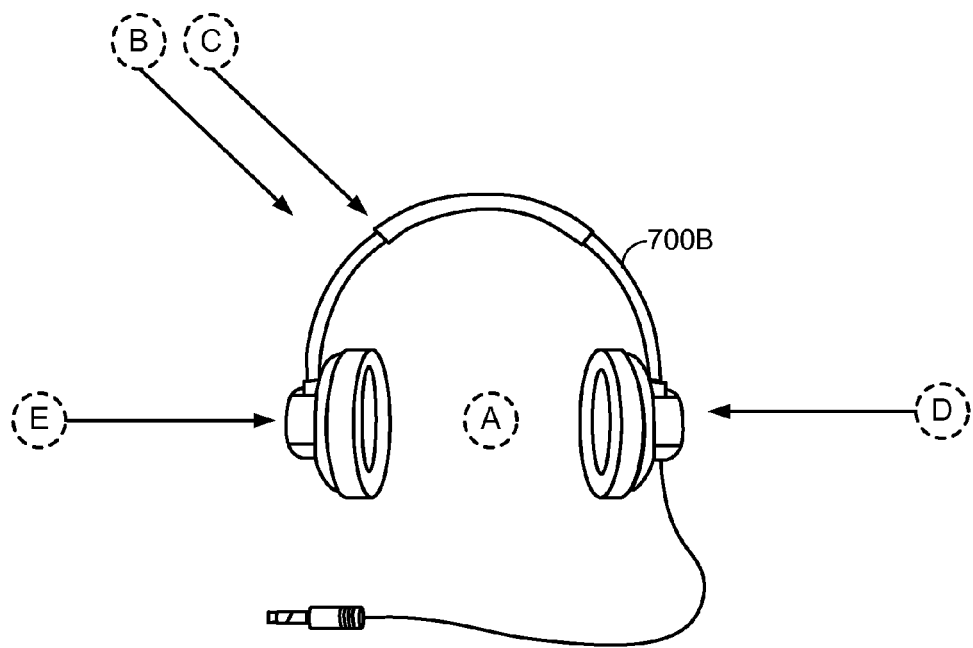
FIG. 7B illustrates virtual origination points or directions with respect to a given access terminal in accordance with an embodiment of the invention.

Referring to FIG. 7B, an audio output device 700B (e.g., shown as a set of headphones in this embodiment) is illustrated in association with AT A. The audio output device 700B being illustrated as a set of headphones is intended to represent a non-limiting example of the type of audio output device that may be connected to AT A. AT A is shown as centered around the audio output device 700B, which is meant to show that the position of AT A (or a user of AT A) is presumed to be centered around the headphones for the purposes of explaining FIG. 7B. Surrounding the audio output device 700B of AT A are examples of virtual origination points or directions for each of ATs B . . . E. For example, AT E is shown as being positioned to the left of AT A with audio from AT E arriving in the left ear or left headphone, ATs B and C are shown as being above and to the left of AT A with audio from ATs B and C arriving in the left ear or headphone of AT A and AT D is shown as being to the right of AT A with audio from AT D arriving in the right ear or headphone of AT A. Aside from whether the audio arrives at AT A in the 'right' or 'left' ear, there is also a sense of direction that is conveyed to the user of AT A. In this sense, the audio output to the user of AT A is considered to be three-dimensional (3D), because the user of AT A will be expected to associate a 3D location or direction from which the audio for a particular AT is emanating. While the audio from ATs B, C and E are each outputted to the user of AT A substantially out of the left 'ear' or headphone, the 3D audio output is configured (e.g., by the application server 170 in the embodiment of FIGS. 6 and 7A) such that, when the user of AT A attempts to pinpoint the virtual-sources of the audio streams, AT E's audio will appear to originate from a different source location than the audio of ATs B and/or C.

Figure 7C:
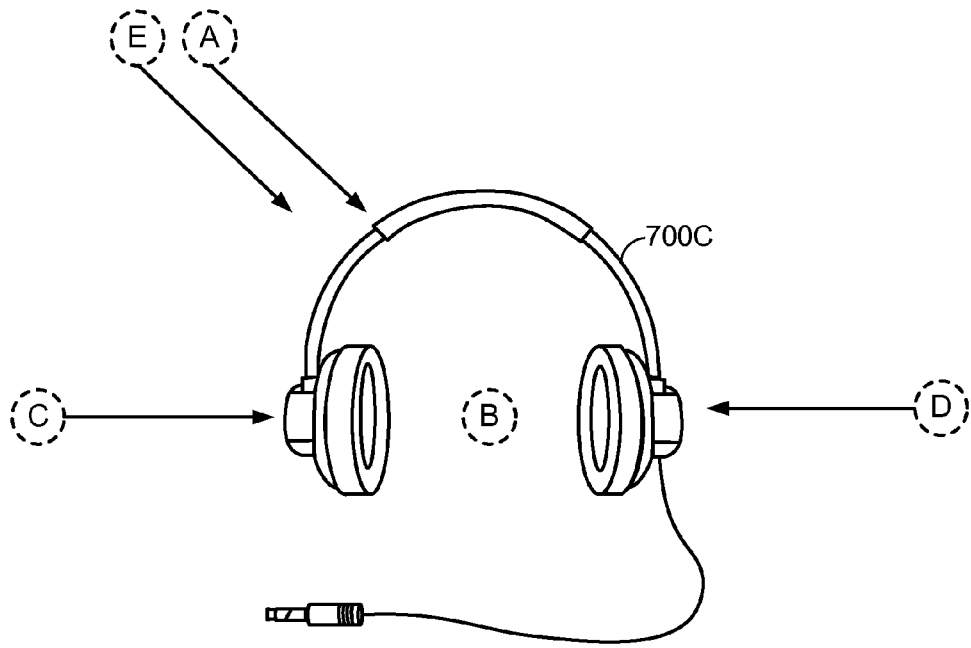
FIG. 7C illustrates virtual origination points or directions with respect to another given access terminal in accordance with an embodiment of the invention.

FIG. 7C is similar to FIG. 7B except that FIG. 7B shows an example of virtual origination points or directions for ATs A and C . . . E from AT B's perspective. Accordingly, referring to FIG. 7B, an audio output device 700B (e.g., shown as a set of headphones in this embodiment) is illustrated in association with AT B. For example, in FIG. 7C, AT C is shown as being positioned to the left of AT B with audio from AT C arriving in the left ear or left headphone, ATs E and A are shown as being above and to the left of AT B with audio from ATs E and A arriving in the left ear or headphone of AT B and AT D is shown as being to the right of AT B with audio from AT D arriving in the right ear or headphone of AT B. Aside from whether the audio arrives at AT B in the 'right' or 'left' ear, there is also a sense of direction that is conveyed to the user of AT B. Similar to FIG. 7B, while the audio from ATs A, C and E are each outputted to the user of AT B substantially out of the left 'ear' or headphone, the 3D audio is configured (e.g., by the application server 170 in the embodiment of FIGS. 6 and 7A) such that, when the user of AT B attempts to pinpoint the virtual-sources of the audio streams, AT C's audio will appear to originate from a different source location (or from a different direction) than the audio of ATs A and/or E.

Referring to FIGS. 7B and 7C, in at least one embodiment, the different virtual origination points or directions that are assigned to ATs A . . . E can be based on their respective location information. For example, in FIG. 7B, ATs B, C and E having their virtual origination points or directions being 'left' of AT A may be used to convey, to the user of AT A, that ATs B, C and E are located west of AT A. Likewise, AT D having its virtual origination point or direction being 'right' of AT A may be used to convey, to the user of AT A, that AT D is located east of AT A. The virtual origination points or directions of ATs B and C also being 'higher' than AT E could be further used to convey an associated elevation (e.g., ATs B and C are on higher ground than AT E), or could convey that ATs B and C are further north than AT E. Also, the similarity between the virtual origination points or directions of ATs B and C can be used to convey, to the user of AT A, that ATs B and C are relatively close together in terms of location (e.g., ATs B and C are located in the same room, the same state, the same country, within a threshold distance from each other, etc.). As will be appreciated, there are many different types of physical and/or geographical location information that can be conveyed via the arrangement of virtual origination points or direction for the ATs that are transmitting media to the group during the group communication session.

Figure 7D:
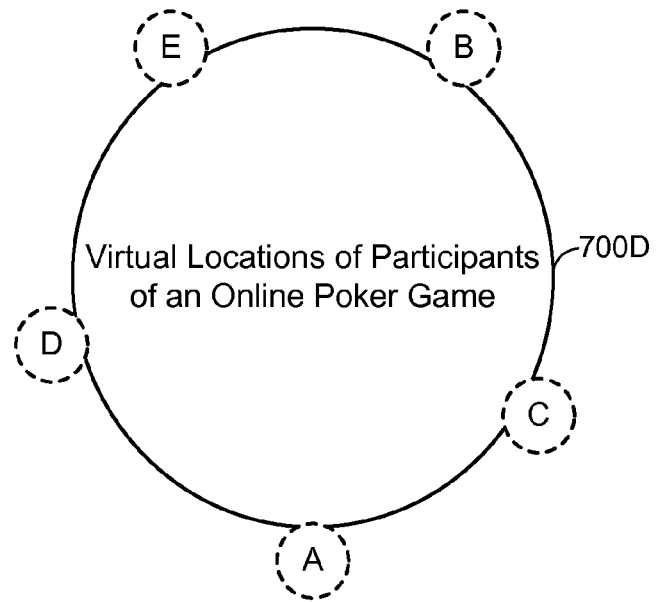
FIG. 7D illustrates an arrangement of poker players around a virtual poker table during an online poker game in accordance with an embodiment of the invention.

FIG. 7D illustrates an arrangement of poker players around a virtual poker table 700D during an online poker game in accordance with an embodiment of the invention. Accordingly, starting at AT A in a clockwise order, the ATs are represented as AT A, AT D, AT E, AT B and AT C. Conventionally, if the poker game was configured to be supported in association with a group communication session whereby the players could speak to each other, the relative positions of the poker players would not be conveyed to each other via the 1D audio that is used to support the group communication session.

Figure 7E:
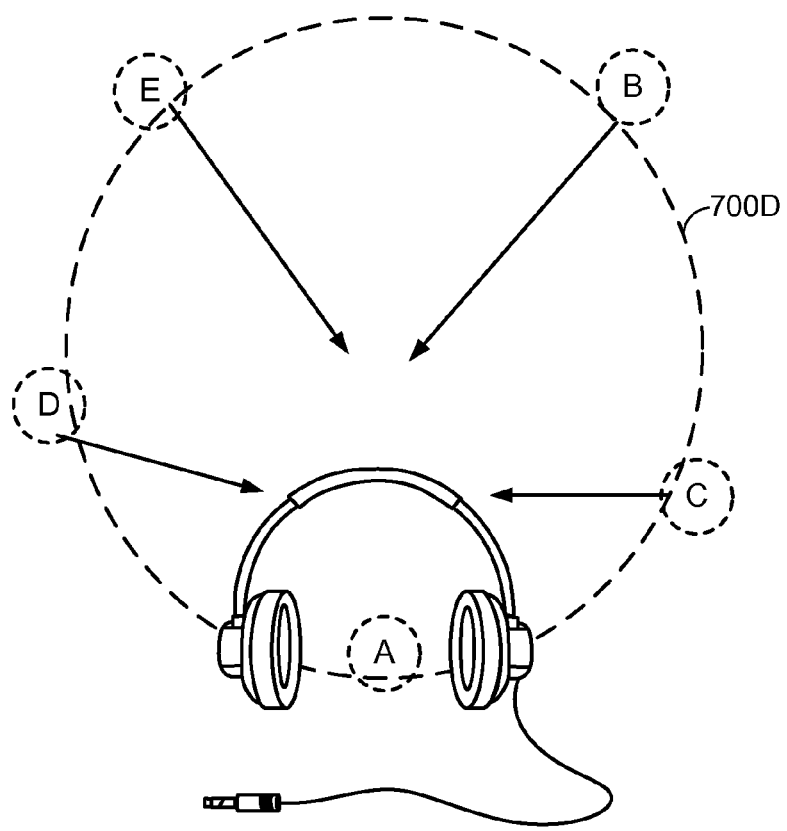
FIG. 7E illustrates examples of how the virtual origination points or directions can be used to convey the relative positions of the poker players around the virtual poker table an access terminal in accordance with an embodiment of the invention.

FIG. 7E illustrates examples of how the virtual origination points or directions of ATs B . . . E can be used to convey the relative positions of the poker players around the virtual poker table 700D to AT A in accordance with an embodiment of the invention. In the embodiment of FIG. 7E, the virtual origination points or directions of ATs B . . . E are established such that, from the perspective of AT A, AT A hears the other poker players speaking as if they were sitting around an actual table. In other words, AT D is virtually seated on AT A's left, and thereby AT D's audio media would appear to the user of AT A as coming from the left of (and perhaps also in front of) AT A, and so on. Accordingly, the 3D audio that provides an artificial sense of the locations of ATs B . . . D can provide a more immersive experience for AT A during the online poker game.

Figure 7F:
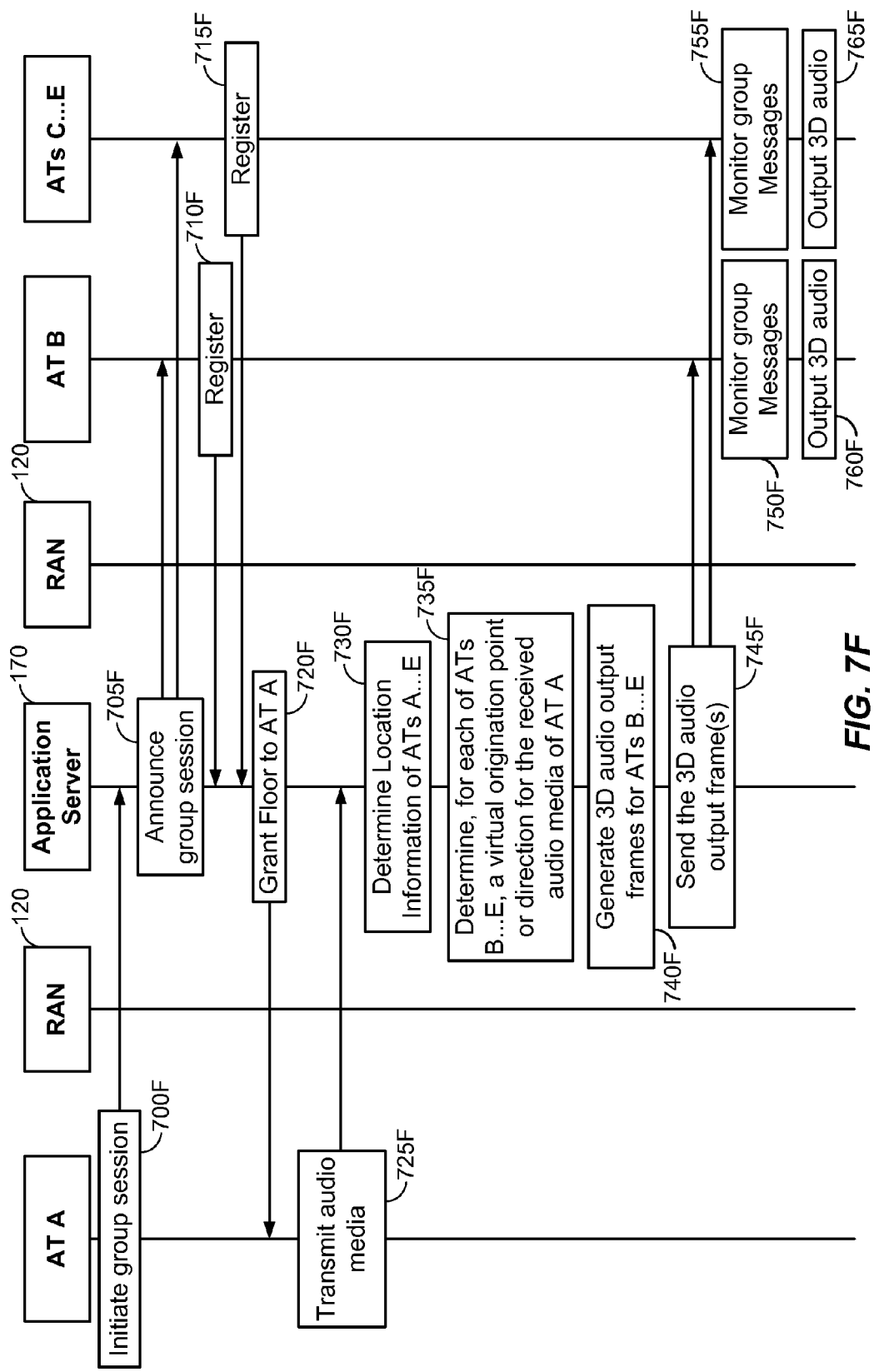
FIG. 7F illustrates an implementation of the process of FIG. 7A within a half-duplex group communication session process in accordance with an embodiment of the invention.

FIG. 7F illustrates an implementation of the process of FIG. 7A within a half-duplex group communication session process in accordance with an embodiment of the invention.

700F through 725F of FIG. 7F substantially correspond to 400 through 425 of FIG. 4A, respectively, and as such will not be described further for the sake of brevity.

In 730F, after the application server 170 begins to receive the audio media from AT A (e.g., as in 700A of FIG. 7A), the application server 170 determines location information of ATs A . . . E (e.g., as in 705A of FIG. 7A). As described above, the location information can correspond to physical locations of ATs A . . . E, such as geographic coordinates and/or serving areas, or to virtual locations of ATs A . . . E, such as seating positions of the users of ATs A . . . E around a virtual poker table.

Next, for each of ATs B . . . E, the application server 170 determines a virtual origination point or direction for AT A based on the determined location information, 735F (e.g., as in 710A of FIG. 7A). For example, the application server 170 can compare AT A's location information with the location information of the target AT among ATs B . . . E to determine the virtual origination point or direction for AT A. Thus, if AT A's location is west of the target AT's location, the application server 170 can set the virtual origination point or direction to be on the left of the target AT in terms of 3D audio, in an example. Again, the determination of 735F can be relative with respect to each target AT. Thus, if AT A's virtual poker seat is between ATs B and C, the 3D audio sent to ATs B and C will make AT A appear to come from different directions based on AT A being seated to the left of AT B and to the right of AT C, for example.

Alternatively, the determination of 735F need not compare AT A's location with any other locations. Rather, in at least one embodiment, AT A's location may be used by itself in determining the virtual origination point or direction for each target AT. For example, the application server 170 may, for at least one target AT, establish a first predetermined virtual origination point or direction for domestic call participants and a second predetermined virtual origination point or direction for international call participants. Thus, irrespective of the locations of ATs B . . . E, the location of AT A can be used by the application server 170 to select a virtual origination point or direction that will be expected to convey, to the target ATs, the domestic or international status of the speaker (in this case, AT A).

After determining the virtual origination point or direction for AT A with respect to each target AT, the application server 170 generates a 3D audio output frame for each of ATs B . . . E that includes AT A's audio media being positioned at the corresponding virtual origination points or directions for the respective target ATs, 740F (e.g., as in 715A of FIG. 7A). The application server 170 sends the 3D audio output frames to the ATs B . . . E in 745F (e.g., as in 720A of FIG. 7A). Each of ATs B . . . E monitor for group messages associated with the group communication session 750F and 755F. Thereby, ATs B . . . E each receive their respective 3D audio output frames from the application server 170, and output the 3D audio contained therein via an audio output device, 760F and 765F.

Figure 7G:
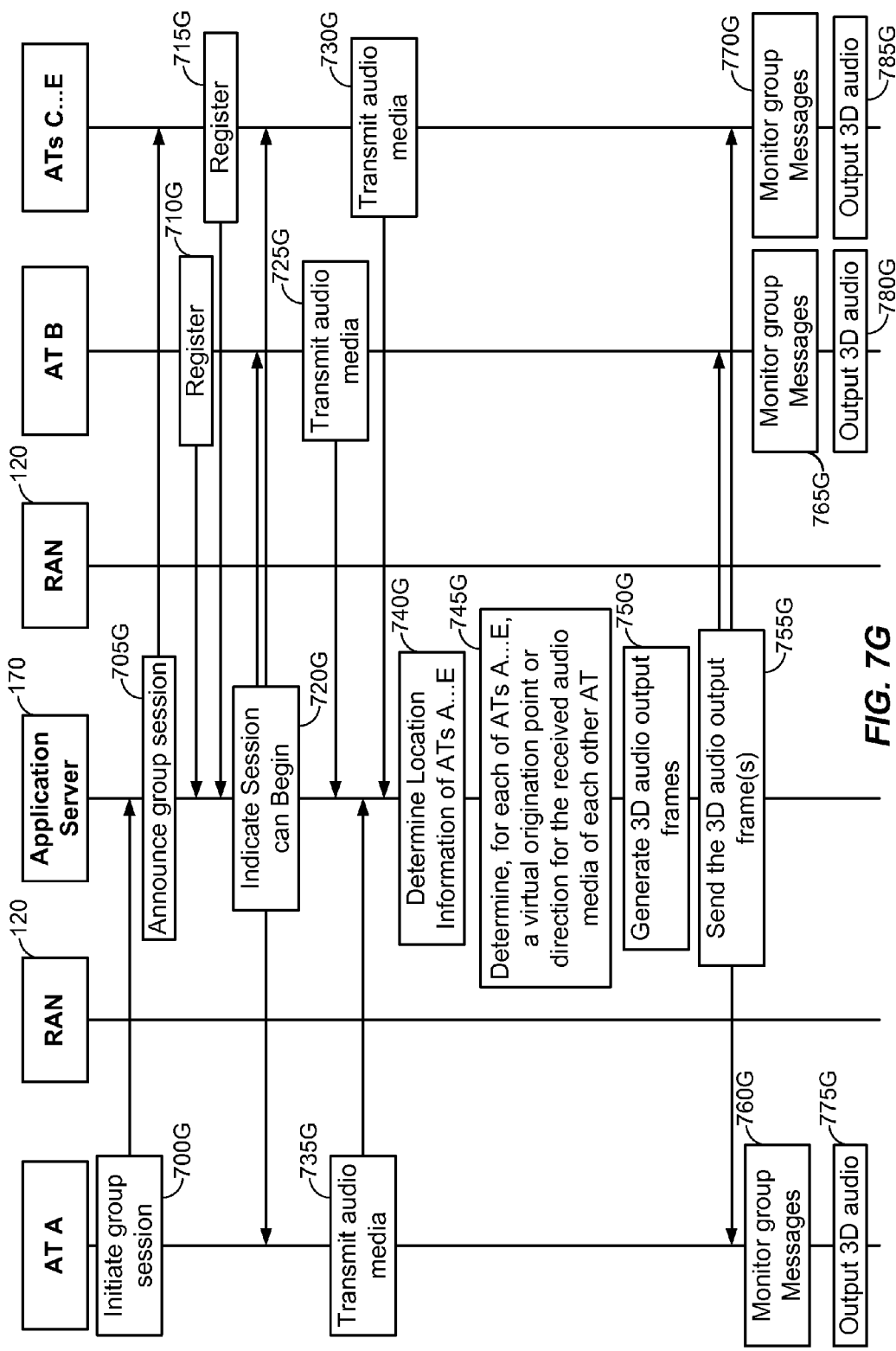
FIG. 7G illustrates an implementation of the process of FIG. 7A within a full-duplex group communication session process in accordance with an embodiment of the invention.

FIG. 7G illustrates an implementation of the process of FIG. 7A within a full-duplex group communication session process in accordance with an embodiment of the invention. 700G through 735G of FIG. 7G substantially correspond to 400B through 435B of FIG. 4B, respectively, and as such will not be described further for the sake of brevity.

In 740G, after the application server 170 begins to receive the audio media from ATs A . . . E (e.g., as in 700A of FIG. 7A), the application server 170 determines location information of ATs A . . . E (e.g., as in 705A of FIG. 7A). As described above, the location information can correspond to physical locations of ATs A . . . E, such as geographic coordinates and/or serving areas, or to virtual locations of ATs A . . . E, such as seating positions of the users of ATs A . . . E around a virtual poker table.

Next, for each of ATs A . . . E, the application server 170 determines a virtual origination point or direction for each other AT based on the determined location information, 745G (e.g., as in 710A of FIG. 7A). For example, the application server 170 can compare each AT's location information with the location information of each other AT to determine the virtual origination points or directions. Thus, if AT A is the target AT, AT A's location can be compared against the location of each of ATs B . . . E. Each of these comparisons results in a particular virtual origination point or direction for a particular AT. Alternatively, for at least one of the ATs, a comparison can be omitted and the AT's location information can simply be used to establish the virtual origination point or direction. For example, in at least one embodiment, assume that ATs located outside of the United States are always outputted as being in the left ear or left side from the perspective of 3D audio output at the target AT. In this case, international ATs can be assigned a virtual origination point or direction based in part on their location without respect to their relative location to the target AT.

After determining the set of virtual origination points or directions for each target AT, the application server 170 generates a 3D audio output frame for each of ATs A . . . E that includes the respective AT's audio media being positioned at the corresponding virtual origination points or directions for the respective target ATs, 750G (e.g., as in 715A of FIG. 7A). The application server 170 sends the 3D audio output frames to the ATs A . . . E in 755G (e.g., as in 720A of FIG. 7A). Each of ATs A . . . E monitor for group messages associated with the group communication session 760G, 765G and 770G. Thereby, ATs A . . . E each receive their respective 3D audio output frames from the application server 170, and output the 3D audio contained therein via an audio output device, 775G, 780G and 785G.

While the embodiments of FIGS. 7A-7G generally describe example implementations of the process of FIG. 6A whereby the group communication session correspond to a group audio communication, other embodiments of the invention are directed to implementing the process of FIG. 6A with respect to group video communication sessions, as will now be described with respect to FIGS. 8A through 8C.

Accordingly, FIG. 8A illustrates a more detailed implementation example of the process of FIG. 6A applied to a group video communication session in accordance with an embodiment of the invention.

Referring to FIG. 8A, the application server 170 is arbitrating a group communication session that includes an exchange of video media between ATs A . . . E, and the application server 170 receives video media from a first set of ATs among ATs A . . . E for transmission to the communication group, 800A. 800A of FIG. 8A is similar to 600 of FIG. 6A except that 800A is more specifically directed to video media. Next, as in 605 of FIG. 6A, the application server 170 determines location information associated with one or more of ATs A . . . E, 805A.

After determining the location information of the one or more ATs among ATs A . . . E, the application server 170 determines, for each of ATs A . . . E, a visual arrangement for the received video media of each AT of the set based on the determined location information, 810A. Examples of visual arrangements for received video media are described in more detail below. After determining the visual arrangement for the received video media in 810A, the application server 170 generates, for each of a second set of ATs A . . . E (e.g., which may be the same as the first set for a full-duplex session, or different in case of a half-duplex session), a video output frame that includes the received video media being arranged in accordance with the determined visual arrangement in 815A. In example, if only one particular AT is providing video media, then each AT except the AT providing the video media may be a target AT for receiving the video output frame to reduce feedback to the transmitting AT.

After generating the video output frames in 815A, the application server 170 sends the video output frames to their corresponding target ATs, 820A. As noted above, each of ATs A . . . E may receive video output frames comprised of different sets of source-ATs (e.g., AT A is sent a video output frame comprised of video media from ATs B . . . E, and so on). Also, it will be appreciated that the location information of the set of ATs may be considered relative to the location information of the target AT for a particular audio frame. Thereby, the position of each AT within the visual arrangement may vary between target ATs in at least one embodiment. This aspect is described in more detail below with respect to FIGS. 8B and 8C.

FIG. 8B illustrates an example visual arrangement of video media from ATs B . . . E for target AT A for an online poker game as illustrated in FIGS. 7D and 7E. As shown in FIG. 8B, unlike FIGS. 5B and 5C, the visual arrangement is established so that the positions of ATs B . . . E within the video output frame correspond to their respective positions to AT A at the virtual poker table. Thus, the user of AT A can view the video output frame shown in FIG. 8B and understand that AT D is virtually represented to the left of AT A at the virtual poker table, that AT C is virtually represented to the right of AT A at the virtual poker table, and so on.

FIG. 8C illustrates an example visual arrangement of video media from ATs A and C . . . E for target AT B for an online poker game as illustrated in FIGS. 7D and 7E. As shown in FIG. 8C, similar to FIG. 8B and unlike FIGS. 5B and 5C, the visual arrangement is established so that the positions of ATs A and C . . . E within the video output frame correspond to their respective positions to AT B at the virtual poker table. Thus, the user of AT B can view the video output frame shown in FIG. 8C and understand that AT C is virtually represented to the left of AT B at the virtual poker table, that AT E is virtually represented to the right of AT B at the virtual poker table, and so on.

Figure 8D:
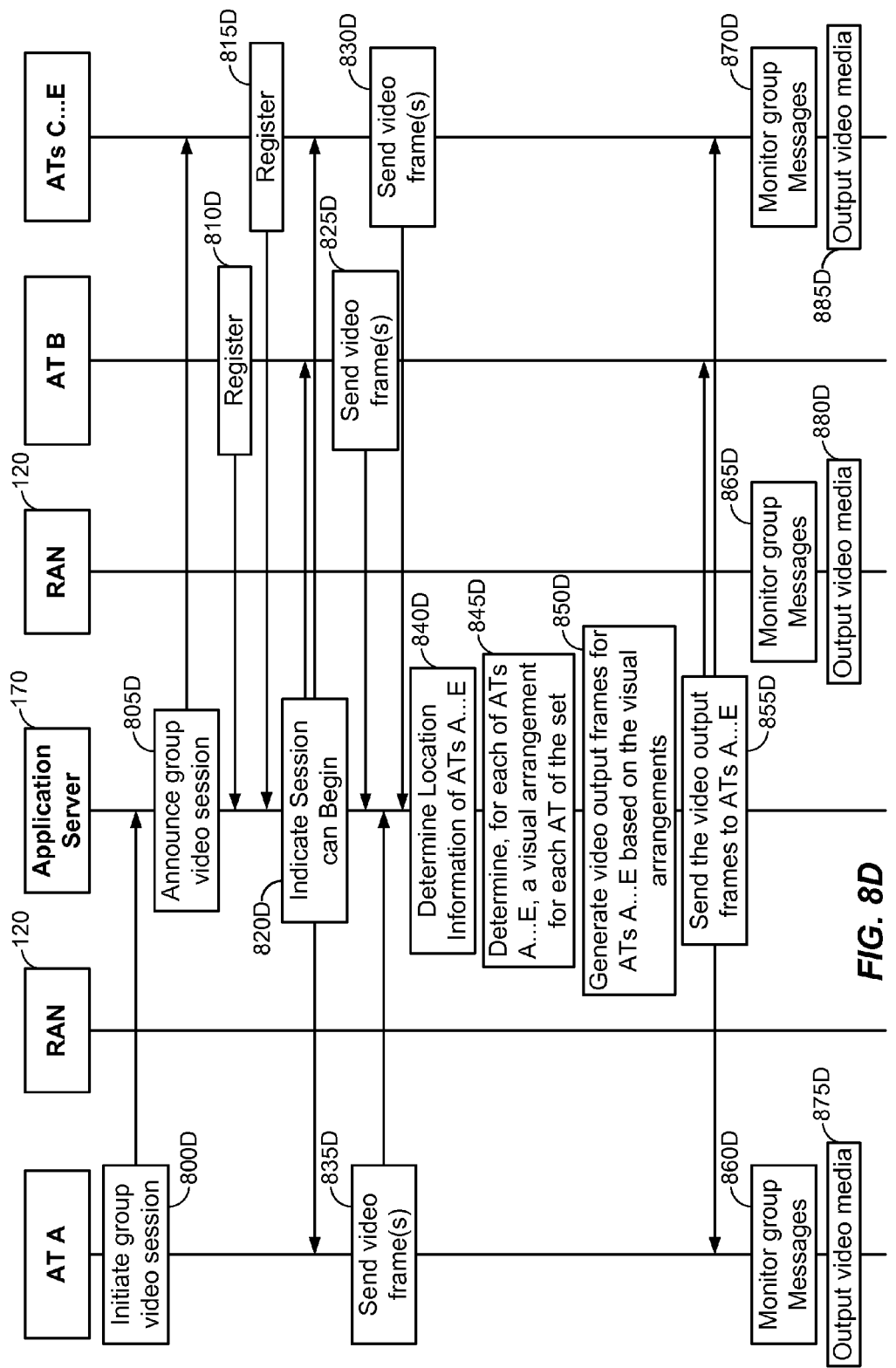
FIG. 8D illustrates an implementation of the process of FIG. 6A within a full-duplex group video communication session process in accordance with an embodiment of the invention.

FIG. 8D illustrates an implementation of the process of FIG. 6A within a full-duplex group video communication session process in accordance with an embodiment of the invention. 800D through 835D of FIG. 8D substantially correspond to 500 through 535 of FIG. 5A, respectively, and as such will not be described further for the sake of brevity.

In 840D, after the application server 170 begins to receive the video media from ATs A . . . E (e.g., as in 800A of FIG. 8A), the application server 170 determines location information of ATs A . . . E (e.g., as in 805A of FIG. 8A). As described above, the location information can correspond to physical locations of ATs A . . . E, such as geographic coordinates and/or serving areas, or to virtual locations of ATs A . . . E, such as seating positions of the users of ATs A . . . E around a virtual poker table.

Next, for each of ATs A . . . E, the application server 170 determines a visual arrangement of the video media for each other AT based on the determined location information, 845D (e.g., as in 810A of FIG. 8A). For example, the application server 170 can compare each AT's location information with the location information of each other AT to determine the virtual origination points or directions. Thus, if AT A is the target AT, AT A's location can be compared against the location of each of ATs B . . . E. Each of these comparisons results in a particular visual arrangement for presentation to the target AT.

After determining the visual arrangement to be presented to each target AT, the application server 170 generates a video output frame for each of ATs A . . . E that includes the respective AT's video media being positioned in accordance with the visual arrangements for the respective target ATs, 850D (e.g., as in 815A of FIG. 8A). The application server 170 sends the video output frames to the ATs A . . . E in 855D (e.g., as in 820A of FIG. 8A). Each of ATs A . . . E monitor for group messages associated with the group communication session 860D, 865D and 870D. Thereby, ATs A . . . E each receive their respective video output frames from the application server 170, and output the specially arranged video media contained therein via a display, 875D, 880D and 885D.

It will be appreciated that FIGS. 6A through 8D have been described as being directed to an embodiment whereby the application server 170 is responsible for selectively formatting media for transmission to a number of target ATs participating in a group communication session based on location information, obtained at the application server 170, of one or more of the participating ATs. In another embodiment of the invention, 'raw' or unformatted media (e.g., 1D audio and/or video output frames that are not in a location-based visual arrangement) can be sent by the application server 170 to the target ATs, with location-based reformatting being implemented at the target ATs themselves (at the discretion of their respective users). It will be appreciated that such an embodiment can potentially consume more bandwidth and/or system resources, but can also provide users more control and flexibility over the manner in which their media is output.

Figure 9A:
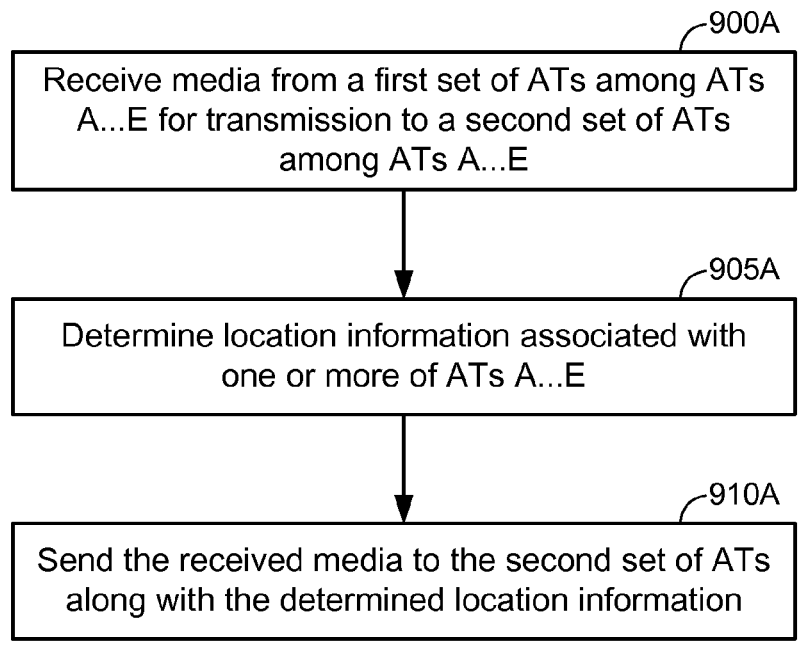
FIGS. 9A and 9B illustrate a high-level media reformatting or mixing process during a group communication session in accordance with at least one embodiment of the invention.
Figure 9B:
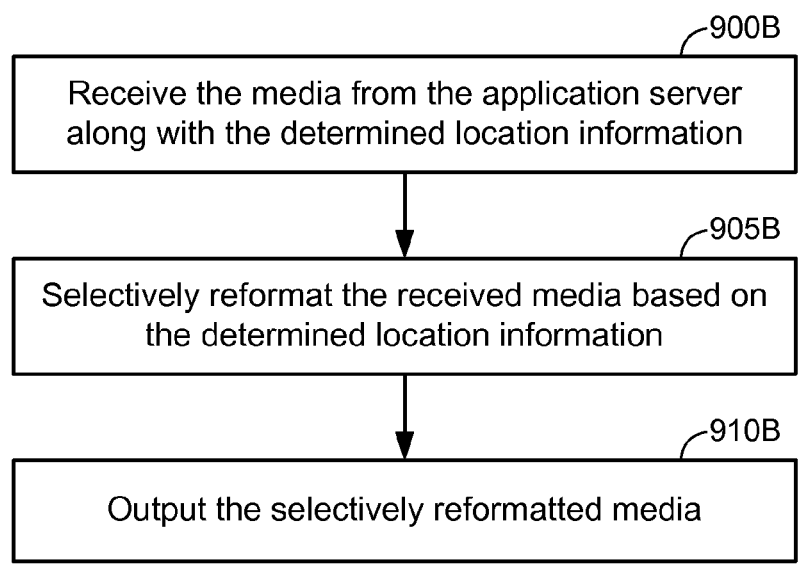

FIGS. 9A and 9B illustrate a high-level media reformatting or mixing process during a group communication session in accordance with at least one embodiment of the invention. Referring to FIG. 9A, the application server 170 is arbitrating a group communication session (e.g., an audio and/or video group communication session) between ATs A . . . E, and the application server 170 receives media from a first set of ATs among ATs A . . . E for transmission to a second set of ATs among ATs A . . . E, 900A. The first set of ATs from which media is received can correspond to a single AT, all ATs participating in the communication session or an intermediate number of ATs. Likewise, the second set of ATs can correspond to all ATs participating in the communication session, or alternatively can correspond to all ATs participating in the communication session except for the AT(s) providing the media that are among the first set. Next, the application server 170 determines location information associated with one or more of ATs A . . . E, 905A, 900A and 905A of FIG. 9A are similar to 600 and 605, respectively, of FIG. 6A.

After obtaining the location information of the one or more ATs in 905A, instead of reformatting the media at the application server 170 as in 610 of FIG. 6A, the application server 170 sends the unformatted media to each respective target AT along with the determined location information, 910A. As will be appreciated, this permits each target AT to make their own independent decisions regarding how to reformat the media. In an example, the media forwarding that occurs in 910A corresponds to sending a separate unmixed stream of media to each target AT. Thus, in a full-duplex audio session involving ATs A . . . E, AT A will be sent four (4) separate audio streams from ATs B . . . E in 910A, and so on. In an example, the transmission of 910A can be performed in accordance with IP unicasting protocols and/or IP multicasting protocols.

FIG. 9B illustrates a continuation of the process of FIG. 9A at one of the target ATs for the media in accordance with an embodiment of the invention. Referring to FIG. 9B, the target AT receives the unformatted media from the application server 170 along with the determined location information, 900B. Then, based on the determined location information, the target AT selectively reformats the received media from 900B. In at least one embodiment, the determined location information conveyed to the target AT from the application server 170 in 910A and 900B can include location-information of one or more ATs other than the target AT, with the target AT expected to be capable of figuring out its own location information (e.g., via GPS or some other mechanism). Thus, in this alternative embodiment, an additional operation (not shown in FIG. 9B) can be for the target AT to determine its own location prior to 905B for use in the selectively reformatting operation of 905B. In an example, the selective reformatting operation of 905B is similar to 610 of FIG. 6A except for being performed at the target AT instead of the application server 170. Also, the selective reformatting operation of 610 of FIG. 6A is performed for each target AT, whereas the selective reformatting operation of 905B is only performed for the target AT that is performing the process of FIG. 9B (although this process can be performed concurrently at each target AT). In an example, the selective reformatting step of 905B can be performed in a manner that is specific to each target AT that receives the media. For example, a user of the target AT can indicate his/her preferences regarding media arrangement, and the target AT can then perform the selective reformatting step of 905B in accordance with the preferred media arrangement of the user. Users of different target ATs can have different preferences related to media arrangement. In FIG. 6B, this aspect is implemented by having the target ATs related the user media arrangement preferences, or selected media-reformatting protocol, to the application server 170. In FIG. 9B, because the target ATs are responsible for reformatting the media themselves, the selected media-reformatting protocol need not be conveyed to the application server 170 as in 600B of FIG. 6B, but can still be implemented by the respective target ATs in 905B.

After reformatting the media in 905B, the target AT outputs the selectively reformatted media to the user thereof, 910B. If the selectively reformatted media includes audio, the outputting of 910B can include outputting 3D audio via speakers connected to the target AT. If the selectively reformatted media includes video, the outputting of 910B can include outputting a video output frame arranged in accordance with a location-based visual arrangement via a display connected to the target AT.

Figure 9C:
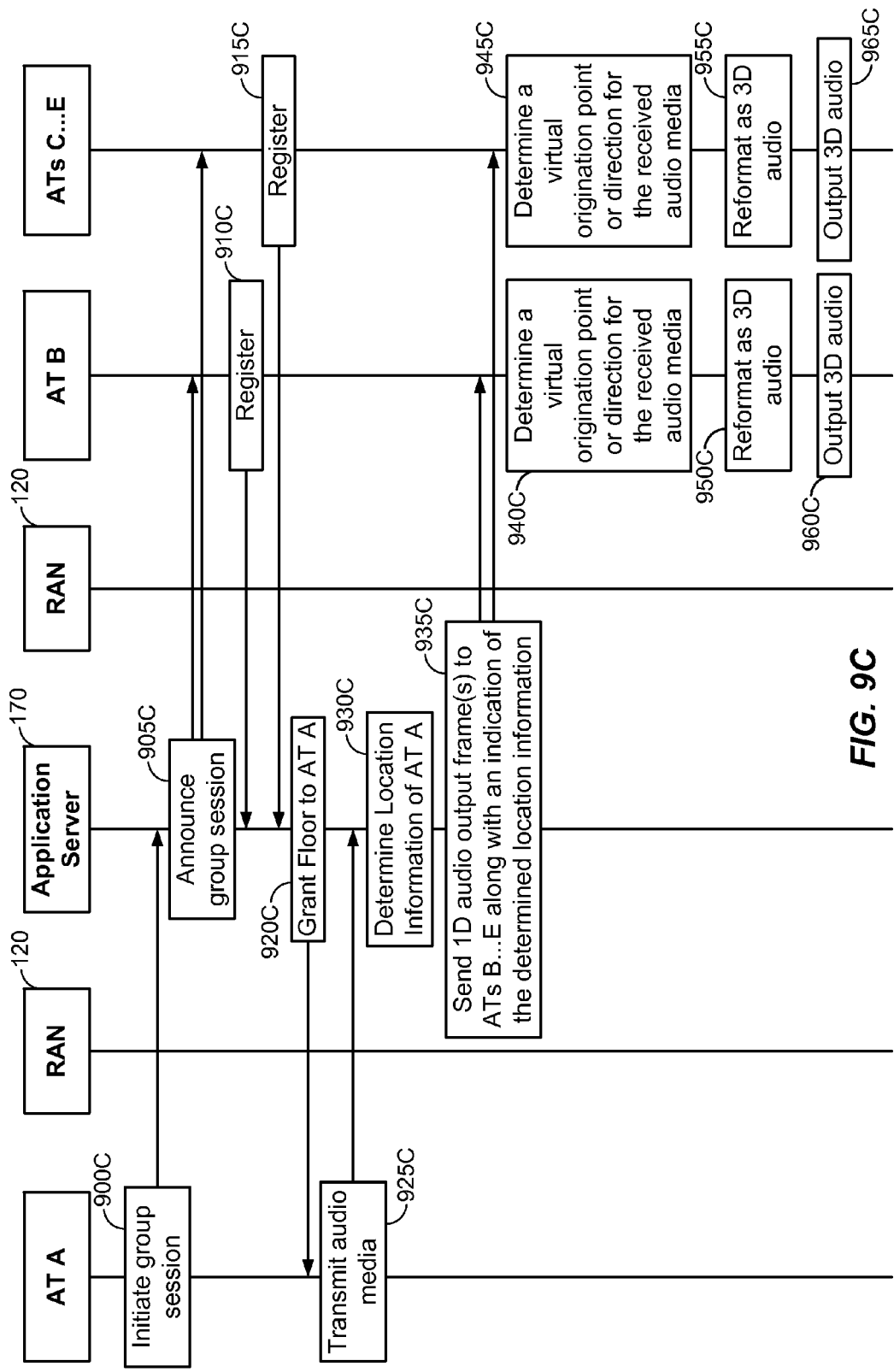
FIG. 9C illustrates an implementation of the process of FIGS. 9A and 9B within a half-duplex group audio communication session process in accordance with an embodiment of the invention.

FIG. 9C illustrates an implementation of the process of FIGS. 9A and 9B within a half-duplex group audio communication session process in accordance with an embodiment of the invention. 900C through 925C of FIG. 9C substantially correspond to 700F through 725F of FIG. 7F, respectively, and as such will not be described further for the sake of brevity.

In 930C, after the application begins to receive the media from AT A, the application server 170 determines location-information associated with at least AT A, 930C. After the application server 170 determines location information of AT A, the application server 170 sends AT A's audio media as 1D audio to each respective target AT (i.e., ATs B . . . E) along with the determined location information, 935A. ATs B . . . E each receive the audio media from the application server 170 and each of ATs B . . . E determine a virtual origination point or direction for the received audio media of AT A based in part of the determined location information of AT A that was conveyed from the application server 170, 940C and 945C. As will be appreciated, the determinations of 940C and 945C can also be based in part on each target AT's own location in an example, which can either be determined independently at each target AT or can be determined at the application server 170 and then sent to each target AT along with AT A's own location information.

After determining the virtual origination point or direction for AT A at each of ATs B . . . E, ATs B . . . E reformat the received audio media of AT A as 3D audio based on the respective virtual origination point or direction, 950C and 955C (e.g., similar to 715A of FIG. 7A, albeit performed at the target ATs instead of the application server 170). After reformatting the audio media into a 3D audio format, ATs B . . . E output the reformatted 3D audio media to their respective users via an audio output device, 960C and 965C.

Figure 9D:
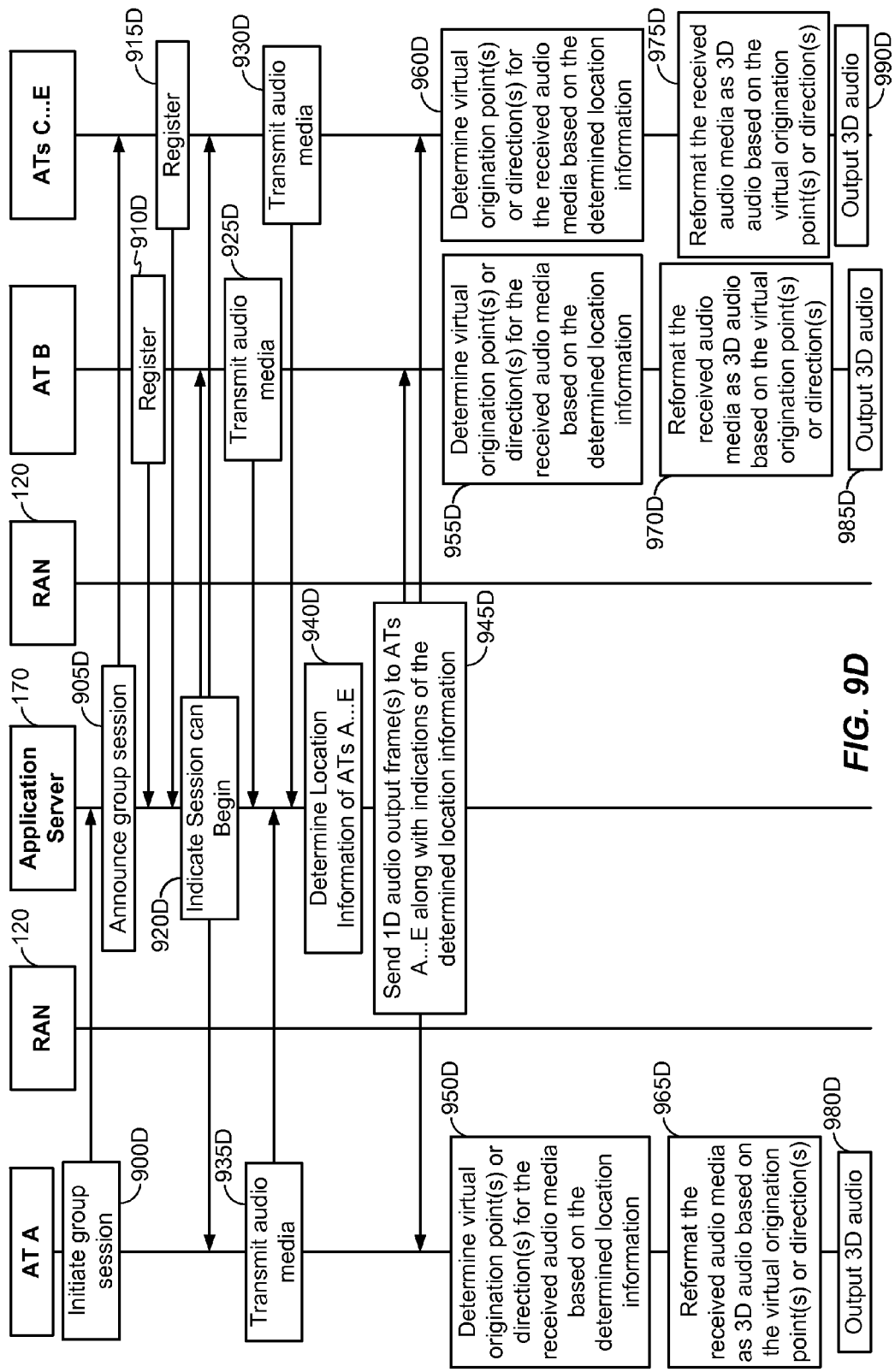
FIG. 9D illustrates an implementation of the process of FIG. 9A within a full-duplex group audio communication session process in accordance with an embodiment of the invention.

FIG. 9D illustrates an implementation of the process of FIG. 9A within a full-duplex group audio communication session process in accordance with an embodiment of the invention. 900D through 935D of FIG. 9D substantially correspond to 400B through 435B of FIG. 4B, respectively, and as such will not be described further for the sake of brevity.

In 940D, after the application server 170 begins to receive the audio media from ATs A . . . E (e.g., as in 900A of FIG. 9A), the application server 170 determines location information of ATs A . . . E (e.g., as in 905A of FIG. 9A). After the application server 170 determines location information of ATs A . . . E, the application server 170 sends the audio media of ATs A . . . E as 1D audio to each respective target AT (i.e., ATs A . . . E) along with the determined location information, 945D. In an example, the application server 170 can send each audio stream from each AT to each of ATs A . . . E. In another example, the application server 170 may send each audio stream to each of ATs A . . . E except for the target AT's own audio media, such that AT A receives the media of ATs B . . . E, and so on. Likewise, with respect to location information, the application server 170 may send the location information determined for each of ATs A . . . E to each target AT. Alternatively, the application server 170 may send the location information for each AT among ATs A . . . E except for the respective target AT, such that AT A receives location information regarding ATs B . . . E but not AT A itself (which AT A can presumably determine on its own in at least one embodiment).

ATs A . . . E each receive the audio media from the application server 170 and each of ATs A . . . E determines a virtual origination point or direction for each provider of the received audio media based in part of the determined location information of the ATs that was conveyed from the application server 170, 950D, 955D and 960D. As will be appreciated, the determinations of 950D, 955D and 960D can also be based in part on each target AT's own location in an example, which can either be determined independently at each target AT or can be determined at the application server 170 and then sent to each target AT along with the location information of the other ATs.

After determining the virtual origination points or directions for the media providers (i.e., the ATs other than the target AT) at each of ATs A . . . E, ATs A . . . E reformat the received audio media as 3D audio based on the respective virtual origination points or directions, 965D, 970D and 975D (e.g., similar to 905B of FIG. 9B). After reformatting the audio media into a 3D audio format, ATs A . . . E output the reformatted 3D audio media to their respective users via an audio output device, 980D, 985D and 990D.

While the embodiments of FIGS. 9C and 9D describe example implementations of the process of FIG. 9A whereby the group communication session correspond to a group audio communication, other embodiments of the invention are directed to implementing the process of FIG. 9A with respect to group video communication sessions, as will now be described with respect to FIG. 9E.

Figure 9E:
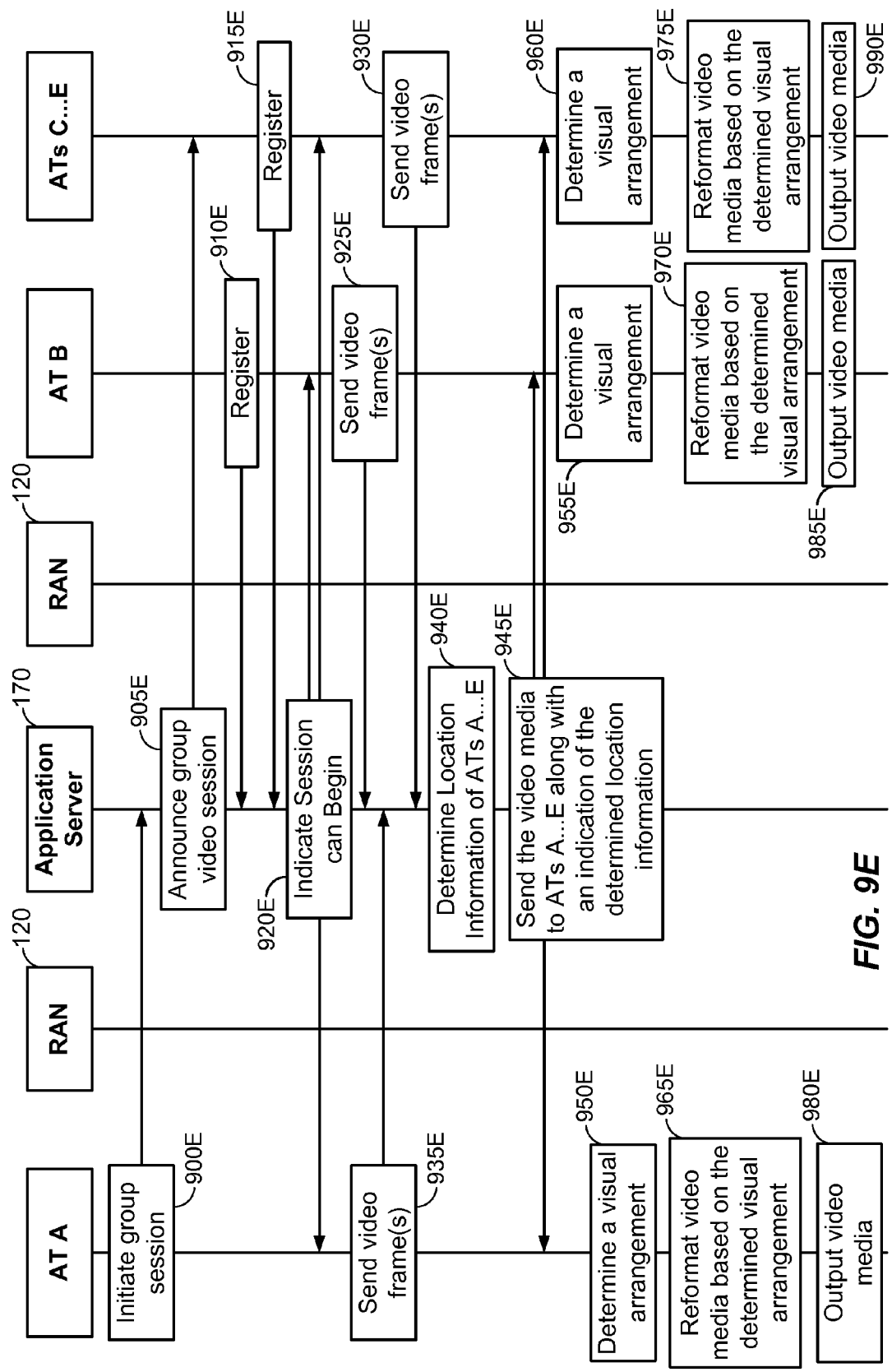
FIG. 9E illustrates an implementation of the process of FIG. 9A within a full-duplex group video communication session process in accordance with an embodiment of the invention.

Accordingly, FIG. 9E illustrates an implementation of the process of FIG. 9A within a full-duplex group video communication session process in accordance with an embodiment of the invention. 900E through 935E of FIG. 9E substantially correspond to 500 through 535 of FIG. 5A, respectively, and as such will not be described further for the sake of brevity.

In 940E, after the application server 170 begins to receive the video media from ATs A . . . E (e.g., as in 900A of FIG. 9A), the application server 170 determines location information of ATs A . . . E (e.g., as in 905A of FIG. 9A). After the application server 170 determines location information of ATs A . . . E, the application server 170 sends the video media of ATs A . . . E as 1D audio to each respective target AT (i.e., ATs A . . . E) along with the determined location information, 945E. In an example, the application server 170 can send each video stream from each AT to each of ATs A . . . E. In another example, the application server 170 may send each video stream to each of ATs A . . . E except for the target AT's own video media, such that AT A receives the media of ATs B . . . E, and so on. Likewise, with respect to location information, the application server 170 may send the location information determined for each of ATs A . . . E to each target AT. Alternatively, the application server 170 may send the location information for each AT among ATs A . . . E except for the respective target AT, such that AT A receives location information regarding ATs B . . . E but not AT A itself (which AT A can presumably determine on its own in at least one embodiment).

ATs A . . . E each receive the video media from the application server 170 and each of ATs A . . . E determines a visual arrangement of the video media for each other AT based on the determined location information, 950E, 955E and 960E (e.g., as in 810A of FIG. 8A, albeit this operation in FIG. 9E is performed at the respective target ATs instead of the application server 170). As will be appreciated, the determinations of 950E, 955E and 960E can also be based in part on each target AT's own location in an example, which can either be determined independently at each target AT or can be determined at the application server 170 and then sent to each target AT along with the location information of the other ATs.

After determining the visual arrangement for the video media from the respective media providers (i.e., the ATs other than the target AT) at each of ATs A . . . E, ATs A . . . E reformat the received video media in accordance with their determined visual arrangement, 965E, 970E and 975E. After reformatting the video media into accordance with their respective visual arrangement, ATs A . . . E output the reformatted video media to their respective users via a display, 980E, 985E and 990E.

While above-described embodiments of the invention have generally been directed to selectively mixing frames during full-duplex sessions, it will be appreciated how the same general teachings can be applied within a hybrid full-duplex implementation. In a hybrid full-duplex session, two or more participants can speak at the same time while other participants listen-only. Thus, during hybrid full-duplex sessions where, for a period of time, whenever a lower-than-threshold number (e.g., one) of speakers are speaking for a given period of time, the jitter-buffer-bypass procedure can be invoked to conserve resources at the MCC 170B that is arbitrating the hybrid full-duplex session.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., access terminal). In the alternative, the processor and the storage medium may reside as discrete components in a user terminal.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method of formatting media during a group communication session, comprising:
   receiving, during the group communication session, media from a first set of access terminals that belong to a communication group, wherein the received media corresponds to content for presentation to a second set of access terminals that belong to the communication group;
   determining location information associated with at least one access terminal among the first or second sets of access terminals; and
   selectively reformatting the received media based on the determined location information, comprising:
      determining, for a given access terminal among the second set of access terminals, a presentation arrangement for presenting the received media to the given access terminal among the second set of access terminals based at least in part on location information associated with the given access terminal relative to location information associated with at least one access terminal among the first set of access terminals; and
      configuring, for the given access terminal among the second set of access terminals, at least one output frame to include the received media in accordance with the presentation arrangement determined from the relative location information.

2. The method of claim 1, wherein the receiving, determining and selectively reformatting steps are performed by an application server arbitrating the group communication session.

3. The method of claim 2, further comprising:
   transmitting the selectively reformatted media to the second set of access terminals.

4. The method of claim 1, wherein the receiving, determining and selectively reformatting steps are performed by a target access terminal for the received media that belongs to the second set of access terminals.

5. The method of claim 4, further comprising:
   presenting the selectively reformatted media on the target access terminal.

6. The method of claim 1, wherein the determined location information corresponds to a physical or geographical location of the at least one access terminal among the first or second sets of access terminals.

7. The method of claim 1, wherein the determined location information corresponds to a virtual location of the at least one access terminal among the first or second sets of access terminals.

8. The method of claim 7, wherein the virtual location corresponds to a relative location of the at least one access terminal at a virtual poker table of an online poker game.

9. The method of claim 1, wherein the group communication session corresponds to a group audio communication session and the received media corresponds to audio media.

10. The method of claim 9, wherein the received media corresponds to one-dimensional (1D) audio media and the selectively reformatting step converts the 1D audio media into three-dimensional (3D) audio media.

11. The method of claim 1, wherein the group communication session corresponds to a group video communication session and the received media corresponds to video media.

12. The method of claim 1, further comprising:
   receiving an indication of a selected media-reformatting protocol from at least one of the second set of access terminals,
   wherein the selectively reformatting step is performed, for the given access terminal among the second set of access terminals, in accordance with the selected media-reformatting protocol.

13. The method of claim 12, wherein the selectively reformatting is performed based a default media-reformatting protocol for any remaining access terminals among the second set of access terminals that do not provide the indication of the selected media-reformatting protocol.

14. A method of formatting media during a group audio communication session, comprising:
   receiving, during the group audio communication session, audio media from a first set of access terminals that belong to a communication group for presentation to a second set of access terminals that belong to the communication group;
   determining location information associated with at least one access terminal among the first or second sets of access terminals; and
   selectively reformatting the received audio media based on the determined location information, wherein selectively reformatting the received audio media comprises:
      selecting, for a given access terminal among the second set of access terminals, a virtual origination point or direction for at least one access terminal among the first set of access terminals; and
      configuring, for the given access terminal among the second set of access terminals, at least one three-dimensional (3D) audio output frame to include the audio media of the at least one access terminal among the first set of access terminals being positioned at the selected virtual origination point or direction.

15. The method of claim 14, wherein:
   the selectively reformatting step is performed by an application server arbitrating the group communication session, and
   the selectively reformatting step is performed independently for each access terminal among the second set of access terminals such that the application server configures a different 3D audio output frame for each access terminal among the second set of access terminals.

16. A method of formatting media during a group video communication session, comprising:
receiving, during the group video communication session, video media from a first set of access terminals that belong to a communication group for presentation to a second set of access terminals that belong to the communication group;
determining location information associated with at least one access terminal among the first or second sets of access terminals; and
selectively reformatting the received video media based on the determined location information, wherein selectively reformatting the received video media comprises:
selecting, for a given access terminal among the second set of access terminals, a visual arrangement for the received video media received from at least one of the first set of access terminals; and
configuring, for the given access terminal among the second set of access terminals, at least one video output frame to include the received video media ef received from the at least one access terminal among the first set of access terminals in accordance with the selected visual arrangement.

17. The method of claim 16, wherein:
the selectively reformatting step is performed by an application server arbitrating the group communication session, and
the selectively reformatting step is performed independently for each access terminal among the second set of access terminals such that the application server configures a different video output frame for each access terminal among the second set of access terminals.

18. An apparatus configured to format media during a group communication session, comprising:
means for receiving, during the group communication session, media from a first set of access terminals that belong to a communication group, wherein the received media corresponds to content for presentation to a second set of access terminals that belong to the communication group;
means for determining location information associated with at least one access terminal among the first or second sets of access terminals; and
means for selectively reformatting the received media based on the determined location information, comprising:
means for determining, for a given access terminal among the second set of access terminals, a presentation arrangement for presenting the received media to the given access terminal among the second set of access terminals based at least in part on location information associated with the given access terminal relative to location information associated with at least one access terminal among the first set of access terminals; and
means for configuring, for the given access terminal among the second set of access terminals, at least one output frame to include the received media in accordance with the presentation arrangement determined from the relative location information.

19. The apparatus of claim 18, wherein the apparatus corresponds to an application server arbitrating the group communication session.

20. The apparatus of claim 18, wherein the apparatus corresponds to a target access terminal for the received media that belongs to the second set of access terminals.

21. An apparatus configured to format media during a group communication session, comprising:
a processor; and
a memory coupled to the processor,
wherein the processor is configured with processor-executable instructions to perform operations comprising:
receiving, during the group communication session, media from a first set of access terminals that belong to a communication group, wherein the received media corresponds to content for presentation to a second set of access terminals that belong to the communication group;
determining location information associated with at least one access terminal among the first or second sets of access terminals; and
selectively reformatting the received media based on the determined location information, comprising
determining, for a given access terminal among the second set of access terminals, a presentation arrangement for presenting the received media to the given access terminal among the second set of access terminals based at least in part on location information associated with the given access terminal relative to location information associated with at least one access terminal among the first set of access terminals; and
configuring, for the given access terminal among the second set of access terminals, at least one output frame to include the received media in accordance with the presentation arrangement determined from the relative location information.

22. The apparatus of claim 21, wherein the apparatus corresponds to an application server arbitrating the group communication session.

23. The apparatus of claim 21, wherein the apparatus corresponds to a target access terminal for the received media that belongs to the second set of access terminals.

24. A non-transitory processor-readable storage medium having stored thereon processor-executable instructions configured to cause a processor to perform operations to configure media during a group communication session, the operations comprising:
receiving, during the group communication session, media from a first set of access terminals that belong to a communication group, wherein the received media corresponds to content for presentation to a second set of access terminals that belong to the communication group;
determining location information associated with at least one access terminal among the first or second sets of access terminals; and
selectively reformatting the received media based on the determined location information, comprising:
determining, for a given access terminal among the second set of access terminals, a presentation arrangement for presenting the received media to the given access terminal among the second set of access terminals based at least in part on location information associated with the given access terminal relative to location information associated with at least one access terminal among the first set of access terminals; and
configuring, for the given access terminal among the second set of access terminals, at least one output frame to include the received media in accordance with the presentation arrangement determined from the relative location information.

25. The non-transitory processor-readable storage medium of claim 24, wherein the processor is coupled to an application server arbitrating the group communication session.

26. The non-transitory processor-readable storage medium of claim 24, wherein the processor is coupled to a target access terminal for the received media that belongs to the second set of access terminals.

27. An apparatus configured to format media during a group audio communication session, comprising:
   means for receiving, during the group audio communication session, audio media from a first set of access terminals that belong to a communication group for presentation to a second set of access terminals that belong to the communication group;
   means for determining location information associated with at least one access terminal among the first or second sets of access terminals; and
   means for selectively reformatting the received audio media based on the determined location information, wherein the means for selectively reformatting comprises:
      means for selecting, for a given access terminal among the second set of access terminals, a virtual origination point or direction for at least one access terminal among the first set of access terminals; and
      means for configuring, for the given access terminal among the second set of access terminals, at least one three-dimensional (3D) audio output frame to include the received audio media of the at least one access terminal among the first set of access terminals being positioned at the selected virtual origination point or direction.

28. An apparatus configured to format media during a group video communication session, comprising:
   means for receiving, during the group video communication session, video media from a first set of access terminals that belong to a communication group for presentation to a second set of access terminals that belong to the communication group;
   means for determining location information associated with at least one access terminal among the first or second sets of access terminals; and
   means for selectively reformatting the received video media based on the determined location information, wherein the means for selectively reformatting comprises:
      means for selecting, for a given access terminal among the second set of access terminals, a visual arrangement for the received video media received from at least one of the first set of access terminals; and
      means for configuring, for the given access terminal among the second set of access terminals, at least one video output frame to include the received video media of received from the at least one access terminal among the first set of access terminals in accordance with the selected visual arrangement.

29. An apparatus configured to format media during a group audio communication session, comprising:
   a processor; and
   a memory coupled to the processor,
   wherein the processor is configured with processor-executable instructions to perform operations comprising:
      receiving, during the group audio communication session, audio media from a first set of access terminals that belong to a communication group for presentation to a second set of access terminals that belong to the communication group;
      determining location information associated with at least one access terminal among the first or second sets of access terminals; and
      selectively reformatting the received audio media based on the determined location information, wherein the selectively reformatting includes operations comprising:
         selecting, for a given access terminal among the second set of access terminals, a virtual origination point or direction for at least one access terminal among the first set of access terminals; and
         configuring, for the given access terminal among the second set of access terminals, at least one three-dimensional (3D) audio output frame to include the received audio media of the at least one access terminal among the first set of access terminals being positioned at the selected virtual origination point or direction.

30. An apparatus configured to format media during a group video communication session, comprising:
   a processor; and
   a memory coupled to the processor,
   wherein the processor is configured with processor-executable instructions to perform operations comprising:
      receiving, during the group video communication session, video media from a first set of access terminals that belong to a communication group for presentation to a second set of access terminals that belong to the communication group;
      determining location information associated with at least one access terminal among the first or second sets of access terminals; and
      selectively reformatting the received video media based on the determined location information, wherein the selectively reformatting includes operations comprising:
         selecting, for a given access terminal among the second set of access terminals, a visual arrangement for the received video media received from at least one of the first set of access terminals; and
         configuring, for the given access terminal among the second set of access terminals, at least one video output frame to include the received video media of received from the at least one access terminal among the first set of access terminals in accordance with the selected visual arrangement.

31. A non-transitory processor-readable storage medium having stored thereon processor-executable instructions configured to cause a processor to perform operations to configure media during a group audio communication session, the operations comprising:
   receiving, during the group audio communication session, audio media from a first set of access terminals that belong to a communication group for presentation to a second set of access terminals that belong to the communication group;
   determining location information associated with at least one access terminal among the first or second sets of access terminals; and
   selectively reformatting the received audio media based on the determined location information, wherein the selectively reformatting includes operations comprising:
      selecting, for a given access terminal among the second set of access terminals, a virtual origination point or direction for at least one access terminal among the first set of access terminals; and configuring, for the given access terminal among the second set of access terminals, at least one three-dimensional (3D) audio output frame to include the received audio media of the at least one access terminal among the first set of access terminals being positioned at the selected virtual origination point or direction.

32. A non-transitory processor-readable storage medium having stored thereon processor-executable instructions configured to cause a processor to perform operations to configure media during a group video communication session, the operations comprising:

receiving, during the group video communication session, video media from a first set of access terminals that belong to a communication group for presentation to a second set of access terminals that belong to the communication group;

determining location information associated with at least one access terminal among the first or second sets of access terminals; and selectively reformatting the received video media based on the determined location information, wherein the selectively reformatting includes operations comprising:

selecting, for a given access terminal among the second set of access terminals, a visual arrangement for the received video media received from at least one of the first set of access terminals; and configuring, for the given access terminal among the second set of access terminals, at least one video output frame to include the received video media received from the at least one access terminal among the first set of access terminals in accordance with the selected visual arrangement.

\* \* \* \* \*